United States Patent [19]
Ito

[11] Patent Number: 5,805,449
[45] Date of Patent: Sep. 8, 1998

[54] VEHICLE MOTION CONTROL SYSTEM

[75] Inventor: Ken Ito, Machida, Japan

[73] Assignee: Nissan Motor Co., Ltd., Kanagawa, Japan

[21] Appl. No.: 439,744

[22] Filed: May 12, 1995

[30] Foreign Application Priority Data

Jun. 1, 1994 [JP] Japan ................................. 6-119772

[51] Int. Cl.⁶ .................................................. B62D 5/04
[52] U.S. Cl. .......................... 364/424.051; 364/426.027; 180/443
[58] Field of Search .................. 364/426.03, 426.01, 364/424.01, 424.03, 424.051, 424.052, 424.053, 424.054; 180/197, 142, 408, 412, 413, 415, 422, 443, 445, 446; 280/91, 91.1

[56] References Cited

U.S. PATENT DOCUMENTS

| | | | |
|---|---|---|---|
| 4,679,808 | 7/1987 | Ito et al. | 280/91 |
| 4,690,431 | 9/1987 | Ito et al. | 280/771 |
| 4,706,771 | 11/1987 | Kawabe et al. | 180/142 |
| 4,706,978 | 11/1987 | Ito | 280/91 |
| 4,718,685 | 1/1988 | Kawabe et al. | 280/91 |
| 4,773,012 | 9/1988 | Ito et al. | 364/424.01 |
| 4,834,204 | 5/1989 | Ito et al. | 180/140 |
| 4,840,389 | 6/1989 | Kawabe et al. | 280/91 |
| 4,901,811 | 2/1990 | Uno et al. | 180/140 |
| 4,947,326 | 8/1990 | Mori et al. | 364/424.05 |
| 4,949,261 | 8/1990 | Ito et al. | 364/424.05 |
| 5,047,939 | 9/1991 | Ito et al. | 364/424.05 |
| 5,103,925 | 4/1992 | Imaseki et al. | 180/415 |
| 5,168,952 | 12/1992 | Oono et al. | 180/197 |
| 5,184,298 | 2/1993 | Imaseki et al. | 364/424.051 |
| 5,212,641 | 5/1993 | Iwata et al. | 364/424.051 |
| 5,228,757 | 7/1993 | Ito et al. | 303/100 |
| 5,267,160 | 11/1993 | Ito et al. | 364/424.05 |
| 5,297,646 | 3/1994 | Yamamura et al. | 180/142 |
| 5,303,989 | 4/1994 | Yasuno et al. | 303/111 |
| 5,341,296 | 8/1994 | Yasuno et al. | 364/426.01 |
| 5,344,224 | 9/1994 | Yasuno | 303/111 |
| 5,388,658 | 2/1995 | Ando et al. | 180/197 |
| 5,402,342 | 3/1995 | Ehret et al. | 364/424.05 |
| 5,406,486 | 4/1995 | Kamio et al. | 364/426.03 |
| 5,482,133 | 1/1996 | Iwata et al. | 180/197 |

FOREIGN PATENT DOCUMENTS

| | | |
|---|---|---|
| 61-67670 | 4/1986 | Japan . |
| 61-113562 | 5/1986 | Japan . |
| 61-115776 | 6/1986 | Japan . |

OTHER PUBLICATIONS

"A NEW WAY OF CONTROLLING A FOUR WHEEL STEERING VEHICLE", Keisoku Jidouseigyo Gakkai Ronbunshu, vol. 23, No. 8, pp. 48–5.(Translations for Abstract Only).

*Primary Examiner*—Collin W. Park
*Attorney, Agent, or Firm*—Lowe, Price, LeBlanc & Becker

[57] ABSTRACT

A vehicle motion control system is combined with a wheel slip control system so as to stabilize vehicle behavior during traction control during which a drive wheel cornering power varies. When the wheel slip control is in operation, a signal of a drive wheel slip is transferred from the wheel slip control system to the motion control system. In response to this signal, the motion control system rewrites a constant representing a drive wheel cornering power, and produces a control signal for controlling the vehicle motion by using the rewritten constant.

34 Claims, 18 Drawing Sheets

VEHICLE MOTION CONTROL SYSTEM

BACKGROUND OF THE INVENTION

1. Field of the Invention

The present invention relates a vehicle control system, and ore specifically to a vehicle control system having a wheel slip control system such as a traction control system (TCS) and a heel steer angle control system such as a four wheel steering 4WS) control system.

2. Related Art

A TCS system is designed to detect wheel idling or wheel pin, and restrain the wheel idling by reducing an output torque f an engine with an engine ignition timing control, a fuel-cut control and/or a throttle control in a direction to decrease a throttle opening degree.

The wheel slip (degree) is related to a driving force and a cornering power (CP) as shown in FIG. 18. In the case of a rear wheel drive vehicle, a strong oversteering characteristic called power oversteer is produced by a sharp decrease of a rear wheel cornering power due to wheel idling caused by application of an excessive driving torque. A vehicle with no TCS might reach wheel spin as shown by a solid line in FIG. 19. In general, the traction control system can retrain this power oversteering by controlling the revolutions of the drive wheels to hold the slip degree (or slip rate) about an optimum value (20%, for example) to provide a maximum driving force.

On the other hand, a rear wheel steer angle control system intended to improve a vehicle steering stability, as disclosed in Japanese Patent Provisional Publication No. S61-113562, is designed to take account of a change in tire cornering power.

However, the conventional CP change adaptive 4WS vehicle without TCS cannot prevent spin due to the above-mentioned power oversteer because the CP of the rear wheels decreases extremely in the region of wheel idling.

The TCS system is effective in preventing wheel spin and vehicle spin when the driving torque becomes excessive. However, the torque control by engine and/or throttle control involves a delay in control, so that the wheel slip degree tends to repeat overshoot and undershoot around the desired slip degree (cf. a wheel slip control range in FIG. 18).

As a result, the rear wheel cornering power increases and decreases repeatedly with the fluctuation of the wheel slip degree, and the motion such as the yaw rate of the vehicle fluctuates as shown by a solid line in FIG. 19 even if the vehicle is equipped with TCS.

SUMMARY OF THE INVENTION

It is therefore an object of the present invention to provide a vehicle control system for providing stable vehicle behavior even when a drive wheel cornering power is varied, for example, during a traction control.

A vehicle motion control system according to a first aspect of the present invention, as shown in FIG. 1, comprises: a wheel slip control system $701a$ for detecting a wheel slip and controlling a wheel slip degree at a desired slip degree; a steering angle sensing means $701b$ for sensing a steering angle or a quantity corresponding to the steering angle; a vehicle speed sensing means $701c$ for sensing a vehicle speed; a target vehicle motion setting means $701d$ for receiving a steering angle signal representing said steering angle and a vehicle speed signal representing said vehicle speed, and determining at least one desired vehicle motion variable by using a first model which is a reference mathematical model simulating a desired dynamic characteristic or a vehicle model made up of at least one equation of motion; a control input determining means $701e$ for receiving said steering angle, said vehicle speed and said desired motion variable, and determining at least one control input command to make a motion of a controlled vehicle equal to said desired motion variable by performing an inverse operation of at least one equation of vehicle motion with an inverse model comprising vehicle constants (or parameters) of the controlled vehicle; a modified cornering power computing means $701f$ for receiving the wheel slip degree detected by said wheel slip control system, and determining a modified value of a cornering power constant (or parameter) which is one of said vehicle constants of said controlled vehicle and which corresponds to a cornering power, in accordance with said wheel slip degree; a constant altering means $701g$ for changing said cornering power parameter of said control input determining means to said modified value of said cornering power constant in response to an actuation signal of said wheel slip control system; and an actuating means $701i$ for controlling a vehicle motion in accordance with said control input command, for example by controlling a vehicle mechanism $701h$ such as a steering mechanism of the vehicle.

A vehicle motion control system according to a second aspect of the present invention comprises, as shown in FIG. 2, a wheel slip control system $702a$; a steering angle sensing means $702b$; a vehicle speed sensing means $702c$; a target vehicle motion setting means $702d$ for receiving the steering angle and the vehicle speed, and determining a desired vehicle motion variable by using a reference mathematical model simulating a desired dynamic characteristic; a control input determining means $702e$ for receiving the steering angle, The vehicle speed and said desired motion variable, and determining a control input command to make an actual motion (such as a yaw rate) of the controlled vehicle identical or closer to said desired motion variable by using an inverse vehicle model comprising vehicle constants specifying the steering response characteristic of the controlled vehicle; a modified cornering power computing means $702f$ for receiving the wheel slip degree detected by said wheel slip control system, and determining a modified value of a cornering power parameter which is one of said vehicle constants of said controlled vehicle and which corresponds to a cornering power of said controlled vehicle, in accordance with said wheel slip degree; a constant altering means $702g$ for changing said cornering power constant of said control input determining means $701e$ to said modified value in response to an actuation signal of said wheel slip control system; and an actuating means $702i$ for controlling an actual vehicle motion, such as the yaw rate, of the controlled vehicle, in accordance with said control input command, for example by controlling a vehicle mechanism $702h$. The control system shown in FIG. 2 further comprises a desired cornering power computing means $702j$ for receiving a desired slip degree determined by said wheel slip control system, and calculating a desired cornering power corresponding to said desired slip degree; and a modified steady state gain setting means $702k$ for determining a modified value of a steady state gain of said reference model in accordance with said desired cornering power. In response to the actuation signal of said wheel slip control system, the constant altering means $702g$ changes said cornering power constant of said control input determining means $702e$ to said modified value of said cornering power constant, and said steady state gain of said reference model to said modified value of said steady state gain.

A vehicle motion control system according to a third aspect of the present invention, as shown in FIG. 3, comprises:

a wheel slip control system 703a for sensing a wheel slip and controlling a wheel slip degree toward a desired slip degree; a steering angle sensing means 703b; a vehicle speed sensing means 703c; a target vehicle motion setting means 703d for receiving a steering input signal representing the steering angle and a vehicle speed signal representing the vehicle speed, and determining a desired vehicle motion variable by using a first model which is one of a reference mathematical model simulating a desired dynamic characteristic and a vehicle model described by an equation of motion; a control input determining means 703e for receiving said steering input, said vehicle speed and said desired motion variable, and determining a control input command to make a motion of an actual vehicle closer to said desired motion variable by using an inverse vehicle model for an inverse operation of an equation of vehicle motion, said inverse model comprising vehicle constants representing vehicle specification items of a controlled vehicle; a modified cornering power determining means 703f for receiving the wheel slip degree detected by said wheel slip control system, and determining a modified value of a cornering power constant which is one of said vehicle constants of said controlled vehicle and which corresponds to a cornering power, in accordance with said wheel slip degree; a desired cornering power determining means 703j for receiving a desired slip degree set by said wheel slip control system, and determining a desired cornering power corresponding to said desired slip degree; a constant altering means 703g for changing said cornering power constant of said control input determining means 703e to said modified value in response to an actuation signal of said wheel slip control system, and a cornering power constant of said vehicle model of said target motion determining means 703d to said desired cornering power; and an actuating means 703i for controlling a vehicle motion in accordance with said control input command.

A vehicle motion control system according to a fourth aspect of the present invention as shown in FIG. 4 comprises: a wheel slip control system 704a; a steering angle sensing means 704b; a vehicle speed sensing means 704c; a first control input computing means 704m for receiving the steering angle signal and the vehicle speed signal, and determining at least one first control input by using a predetermined function; a target vehicle motion setting means 704d for receiving not only said steering input, said vehicle speed but also said first control input, and determining a desired vehicle motion variable of at least one kind by using a vehicle model described by an equation of motion; a second control input computing means 704e for receiving said steering input, said vehicle speed, said first control input and said desired motion variable, and determining at least one second control input to make an actual motion of a controlled vehicle closer to said desired motion variable by performing an inverse operation of an equation of vehicle motion by using an inverse vehicle model comprising vehicle constants characteristic of the controlled vehicle; a final control input determining means 704n for determining a control input command by adding said first and second control inputs; a cornering power modifying means 704f for receiving the wheel slip degree detected by said wheel slip control system, and determining a modified value of a cornering power constant which is one of said vehicle constants of said second control input computing means 704e and which corresponds to a cornering power, in accordance with said wheel slip degree; a constant altering means 704g for changing said cornering power constant of said second control input computing means 704e to said modified value in response to an actuation signal of said wheel slip control system 704a; and an actuating means 704i for controlling a vehicle motion in accordance with said control input command determined by said control input determining means 704n.

A vehicle motion control system according to a fifth aspect of the invention, as shown in FIG. 5, comprises: a wheel slip control system 705a; a steering angle sensing means 705b; a vehicle speed sensing means 705c; a first control input computing means 705m substantially identical to the first control input computing means 704m of FIG. 4; a target vehicle motion setting means 705d for receiving the steering angle, the vehicle speed and the first control input, and determining a desired vehicle motion variable by using a vehicle model described by an equation of motion; a second control input computing means 705e for receiving said steering input, said vehicle speed, said first control input and said desired motion variable, and determining at least one second control input to make an actual motion of the controlled vehicle closer to said desired motion variable by performing an inverse operation of an equation of vehicle motion by using vehicle constants characteristic of the controlled vehicle; a control input determining means 705n for determining a control input command by adding said first and second control inputs; a modified cornering power determining means 705f for receiving the wheel slip degree detected by said wheel slip control system, and determining a modified value of a cornering power constant which is one of said vehicle constants of said second control input computing means 705e and which corresponds to a cornering power, in accordance with said wheel slip degree; a desired cornering power calculating means 705j for receiving a desired slip degree determined by said wheel slip control system, and calculating a desired cornering power corresponding to said desired slip degree; a constant altering means 705g for changing said cornering power constant of said second control input determining means 705e to said modified value of the cornering power constant, and a cornering power constant of said vehicle model of said target motion setting means 705d to said desired cornering power in response to an actuation signal of said wheel slip control system; and an actuating means 705i for controlling a vehicle motion in accordance with said control input command determined by said control input determining means 705n.

The vehicle motion control system according to each of the aspects of the invention can modify the constant representing the cornering power in the control input determining means 701e, 702e, . . . or 705e, in accordance with the sensed wheel slip degree during the control action of the wheel slip control system, to prevent the undesired variation of the vehicle behavior due to increase and decrease of the cornering power.

The vehicle motion control system according to the second or third aspect of the invention can further prevent the fluctuation of the vehicle behavior due to variation of the cornering power by modifying the cornering power constant of the control input determining means and the steady state gain of the reference model or the cornering power constant of the vehicle model of the target motion setting means during the wheel slip control operation. For example, the steady state gain is a magnitude of the yaw rate with respect to the steering angle in the steady state.

The control system according to the fourth or fifth aspect of the invention can prevent the undesired vehicle behavior fluctuation during the wheel slip control operation by adjusting the model of the second control input computing means or adjusting the models of both of the target motion setting means and the second control input computing means.

DETAILED DESCRIPTION OF THE INVENTION

Figure 6:
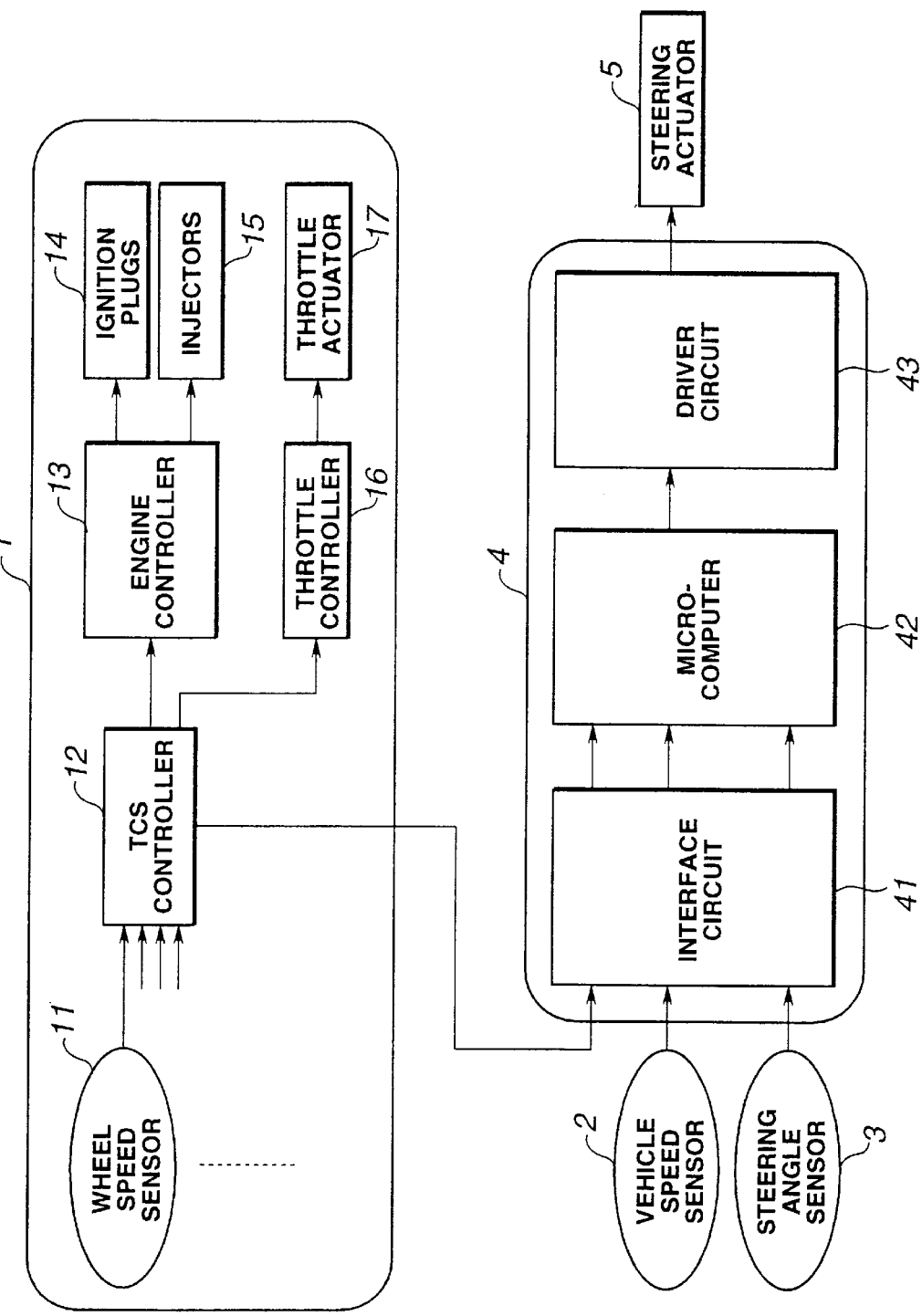
FIG. 6 is a block diagram showing an arrangement of hardware items employed in each of practical examples according to first through fifth embodiments of the present invention.

FIG. 6 shows a vehicle control system employed in an illustrated example according to each of the disclosed embodiments of the present invention.

A vehicle shown in FIG. 6 has a wheel slip control system 1 and a steering control system which, in the example shown in FIG. 6, is a four wheel steering (4WS) system.

The wheel slip control system 1 of this example comprises wheel speed sensors 11, a TCS controller 12, an engine controller 13, ignition plugs 14, injectors 15, a throttle controller 16 and a throttle actuator 17.

The 4WS control system of this example comprises a vehicle speed sensor 2, a steering angle sensor 3, a 4WS controller 4, and a steering actuator 5. The 4WS controller 4 comprises an interface circuit 41, an onboard microcomputer 42 serving as a main processing section, and a driver circuit 43. It is possible to use the non-drive wheel speed sensors 11 for sensing the wheel speeds of the non-drive wheels of the vehicle as the means for sensing the vehicle speed.

In the wheel slip control system 1, the wheel speed sensors 11 sense the wheel speeds of the respective wheels of the vehicle individually. The signal representing the wheel speed of each wheel is inputted to the TCS controller 12. From the input wheel speed signals, the TCS controller 12 calculate a degree of wheel slip of the drive wheels with respect to the non-drive wheels. In the case of a rear wheel drive vehicle, the non-drive wheels are the front wheels, and the drive wheels are the rear wheels. When this wheel slip degree exceeds a predetermined value or when the wheel slip degree is likely to exceed the predetermined value, the TCS controller 12 sends an ignition retard signal and a fuel cut signal to the engine controller 13 and a throttle closing signal to the throttle controller 16 to restrain the wheel slip to a desired slip degree (20%, for example). In accordance with these signals, the engine controller 13 and the throttle controller 16 control the ignition plugs 14, the injectors 15 and the throttle actuator 17. The TCS controller 12 sends these signals so as to prevent wheel idling of the drive wheels, and further sends a TCS actuation signal and information on the wheel slip degree to the 4WS controller 4.

The control system shown in FIG. 6 employs a reference model and a vehicle model which are defined as follows:

The reference model is a mathematical model having a transfer characteristic which is different from an inherent characteristic of a vehicle response (such as a yaw rate) of a controlled vehicle (which is a controlled system) to a steering input such as a steering angle. Generally, this transfer characteristic of the reference model is chosen flexibly as desired by a designer of a vehicle.

The vehicle model is one or more mathematical equations, such as equations of vehicle motion, representing vehicle motion responsive to a steering input. The vehicle model includes one or more constants (or parameter) corresponding to vehicle specification data items such as a vehicle mass, a yawing moment of inertia, a steering gear ratio, a wheel base, a front and rear weight distribution, a front wheel cornering power and a rear wheel cornering power. These constants (parameters) are set equal to respective values in a standard state (in which, for example, two persons are on the vehicle, and the vehicle is in a constant speed running state on a dry road).

Figure 1:
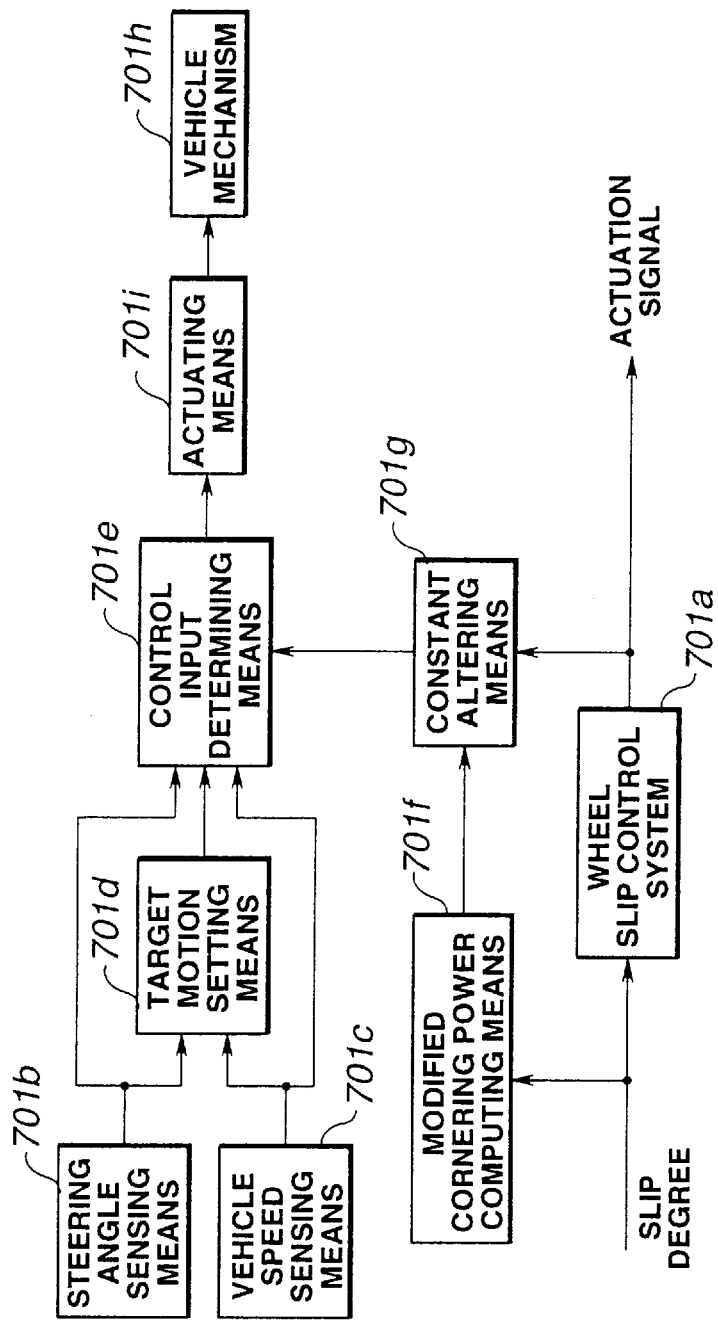
FIG. 1 is a block diagram schematically showing a vehicle control system according to a first aspect of the present invention.
Figure 7:
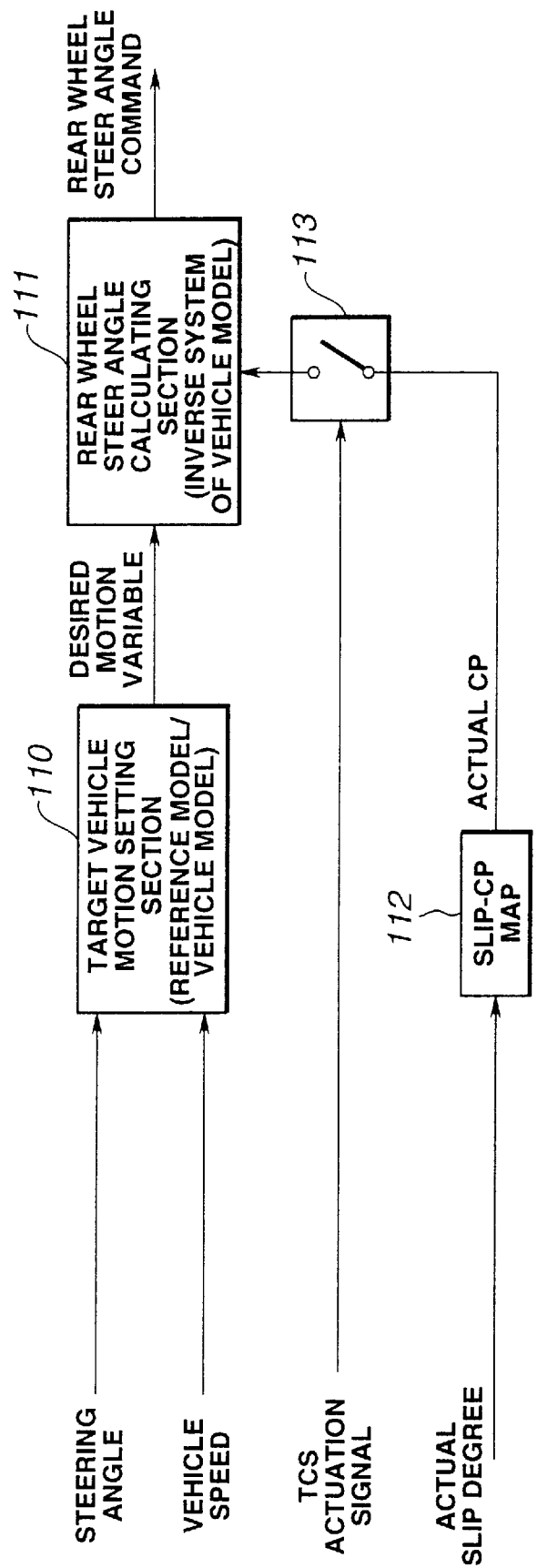
FIG. 7 is a block diagram showing a 4WS controlling system in an example according to the first embodiment corresponding to the first aspect of the present invention.

FIG. 7 shows a 4WS controlling system according to the first embodiment corresponding to the first aspect of the present invention shown in FIG. 1. In this example, the system shown in FIG. 7 is a system of program software of the microcomputer 42 shown in FIG. 6.

The controlling system shown in FIG. 7 includes a target vehicle motion setting section 110, a control input determining means 111 which, in this example, in the form of a rear wheel steer angle calculating (or determining) section, a map section 112 and a constant altering switching section 113.

The target vehicle motion setting section 110 is a section for determining a value of a desired vehicle motion variable according to the reference model representing a vehicle response characteristic as intended by a designer, in the form of a mathematical model. In this example, the section 110 receives the steering angle such as a steering wheel angle, and the vehicle speed, as input signals, calculates the desired vehicle motion variable such as the vehicle yaw rate, and delivers an output signal representing the determined value of the desired motion variable.

The control input determining section 111 (in the form of the rear wheel steering angle calculating section) receives the steering angle, the vehicle speed and the desired motion variable determined by the target motion setting section 110 as input signals, and determines a steering control input which, in this example, is a rear wheel steer angle. The rear wheel steer angle determining section 111 calculates the rear wheel steer angle required to achieve the desired vehicle motion variable determined by the section 110, by performing inverse operation of one or more equations of motion using vehicle constants (representing vehicle specification data items) of the controlled vehicle. The controlled vehicle is the vehicle which is equipped with, and controlled by, this control system.

Control systems having similar vehicle motion setting section and rear wheel steer angle determining section are disclosed in various documents. Some examples are: a U.S. Pat. No. 4,834,204; Japanese Patent Provisional Publications Nos. 61-67670 and 61-115776; and "A New Way of Controlling a Four Wheel Steering Vehicle" Keisoku Jidouseigyo Gakkai Ronbunshu Vol. 23, No. 8, pages 48~54.

The rear wheel steer angle determining section 111 uses the vehicle constants which comprises a vehicle constant corresponding to a rear wheel cornering power (CP). Normally, this constant is set equal to a value at a constant speed operation (the slip degree is approximately equal to zero.).

Figure 18:
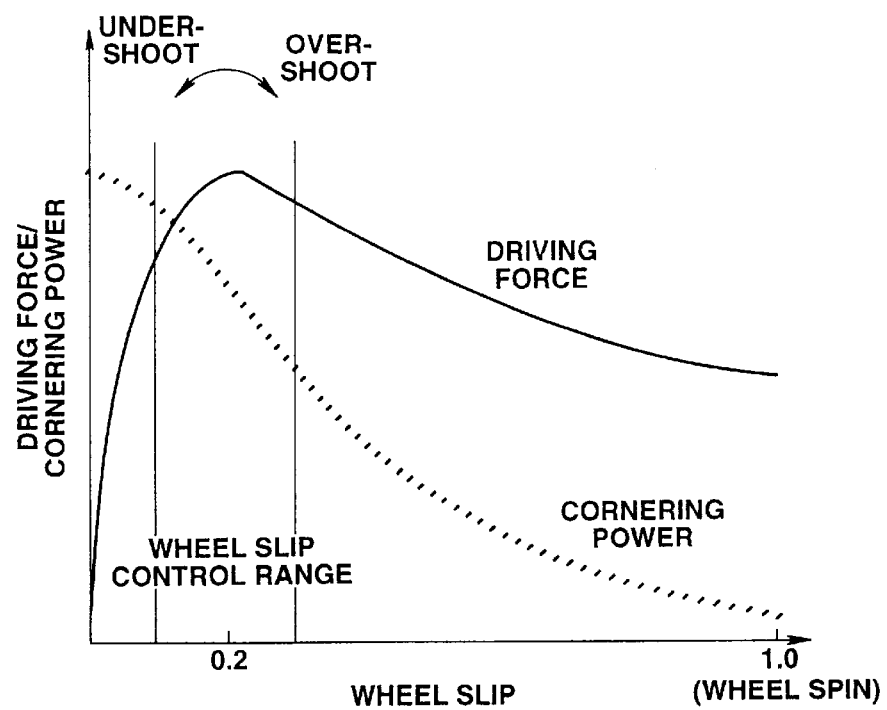
FIG. 18 is a graph showing characteristic of driving force and cornering power with respect to a wheel slip degree.
Figure 19:
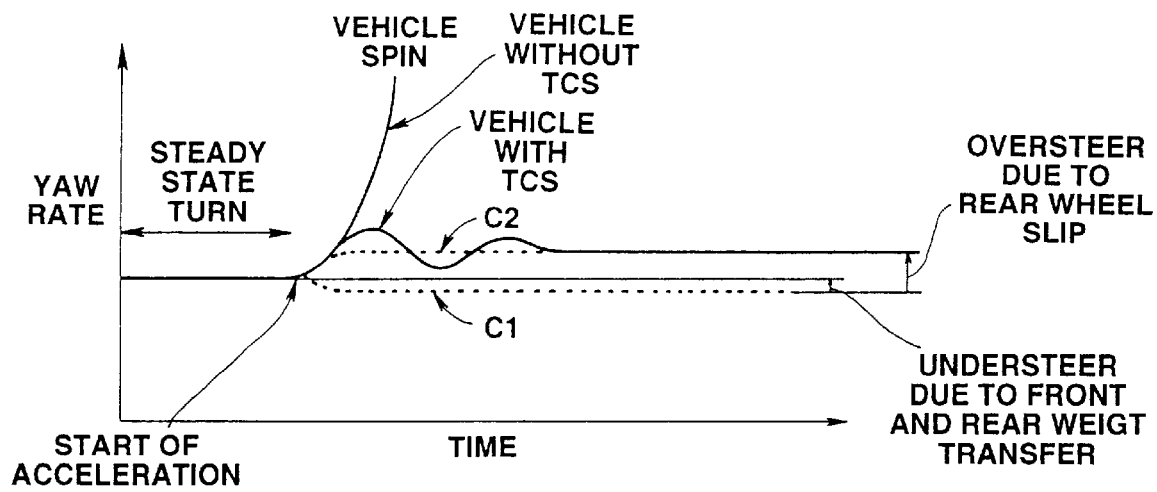
FIG. 19 is a graph showing vehicle yaw-rate characteristics of a vehicle having no TCS and a vehicle equipped with TCS during a turn with acceleration.

The map section 112 is a section for determining a rear wheel cornering power from a slip degree. In this example, a map of relation between the slip degree and the cornering power as shown by a broken line in FIG. 18 is preliminarily stored, and the map section 112 determines the cornering power by using the stored map.

The constant altering switching section 113 is turned on by the TCS actuation signal.

Figure 8:
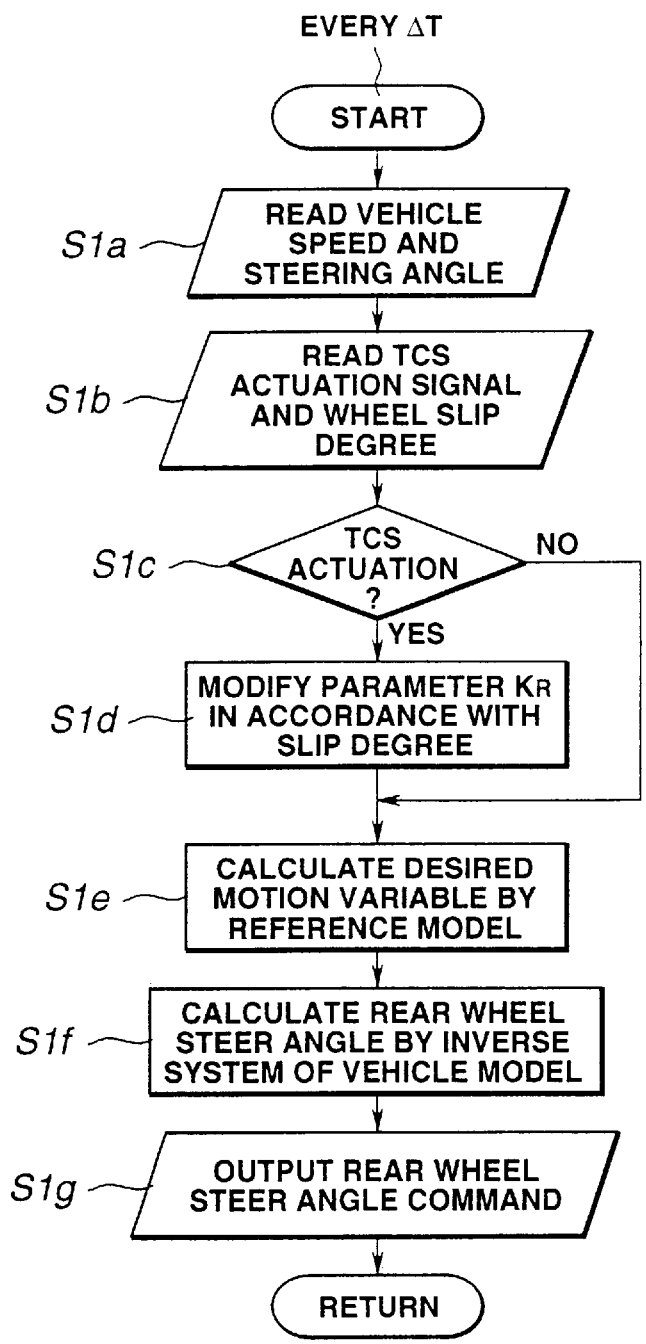
FIG. 8 is a flow chart showing a rear wheel steer angle control procedure performed by a 4WS controller in the example shown in FIG. 7 according to the first embodiment.

FIG. 8 shows a rear wheel steer angle control procedure performed by the 4WS controller according to the first embodiment of the present invention.

At a step S1$a$, the controller 4 (or the CPU of the microcomputer 42) reads the vehicle speed sensed by the vehicle speed sensor 2, and the steering angle sensed by the steering angle sensor 3.

At a step S1$b$, the controller 4 reads the TCS actuation signal and the wheel slip degree supplied from the TCS controller 12. At a step S1$c$, the controller 4 determines whether the traction control system is in operation or not, by checking the TCS actuation signal.

At a step S1$d$, the controller 4 modifies a parameter (or constant) KR of the rear wheel steer angle determining section 111, in accordance with the above-mentioned wheel slip degree. The parameter KR is the vehicle constant representing a rear wheel cornering power CP.

At a step S1$e$, the controller 4 calculates the desired vehicle motion variable according to the reference model in the target motion setting section 110.

At a step S1$f$, the controller 4 calculates the rear wheel steer angle according to the inverse system of the vehicle model by using the rear wheel cornering power parameter KR which is modified at the step S1$d$ if the TCS is in action.

At a step S1$g$, the controller 4 delivers the rear wheel steer angle command signal representing the rear wheel steer angle determined at the step S1$f$.

In a normal running operation in which no wheel spin is involved, the flow of control is: Step S1$a$→Step S1$b$→Step S1$c$→Step S1$e$→Step S1$f$→Step S1$g$. Without modifying the rear wheel cornering power parameter KR, the 4WS control system can achieve an intended vehicle behavior in effect.

When, because of a driver's accelerator operation, an excessive driving torque is applied and the TCS system starts performing its control operation, then the controller 4 follows the sequence of: Step S1$a$→Step S1$b$→Step S1$c$→S1$e$→Step S1$f$→Step S1$g$. Therefore, the controller 4 modifies the rear wheel cornering power parameter KR of the rear wheel steer angle determining section 111 at the step S1$d$, and computes the rear wheel steer angle by using the modified parameter KR.

Thus, the 4WS system determines the rear wheel CP in accordance with the TCS actuation signal and the data on the rear wheel slip degree supplied from the TCS system, by using the slip degree versus CP relation map; rewrites the rear wheel cornering power parameter KR in the rear wheel steer angle calculating section 111 (at the step S1$d$); and computes the rear wheel steer angle by using this parameter KR (at the step S1$f$). As a result, this system can prevent a fluctuation of the vehicle motion (such as the yaw rate) during cornering acceleration as shown by a broken line characteristic C1 in FIG. 17.

In the first embodiment, in place of the reference model, it is optional to employ a vehicle model having vehicle constants (vehicle specification data items) of the controlled vehicle. In this case, the target motion setting section 110 and the rear wheel steer angle determining section 111 use the same vehicle constants (parameters) in the normal running operation, so that the rear wheel steer angle remains equal to zero, and the 4WS system does not act to improve the performance. However, in such a hard accelerating operation during a turn as to actuate the TCS system, the control system can absorb a CP variation due to a rear wheel slip, and provides a similar effect as in the example employing the reference model.

Figure 2:
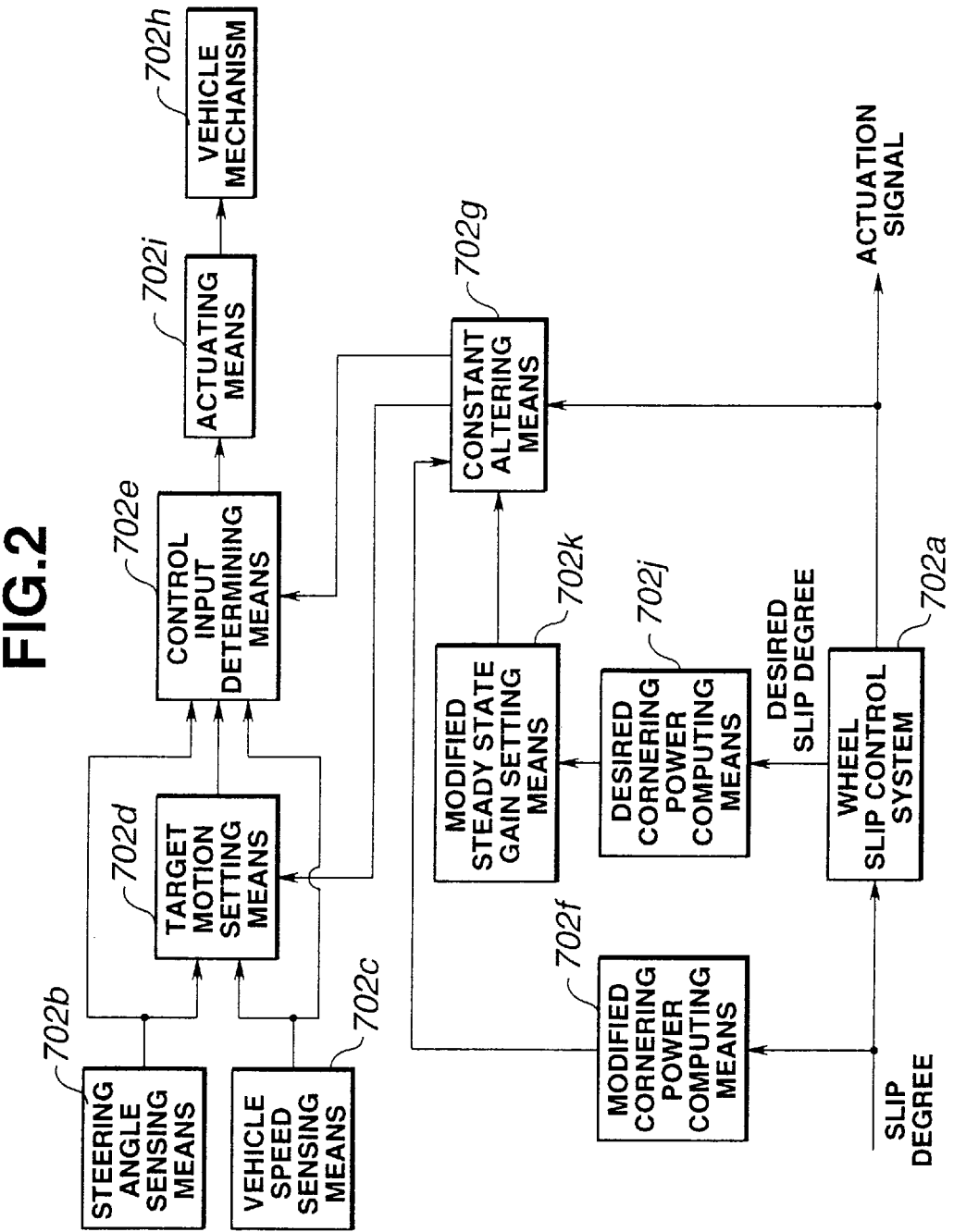
FIG. 2 is a block diagram schematically showing a vehicle control system according to a second aspect of the present invention.
Figure 9:
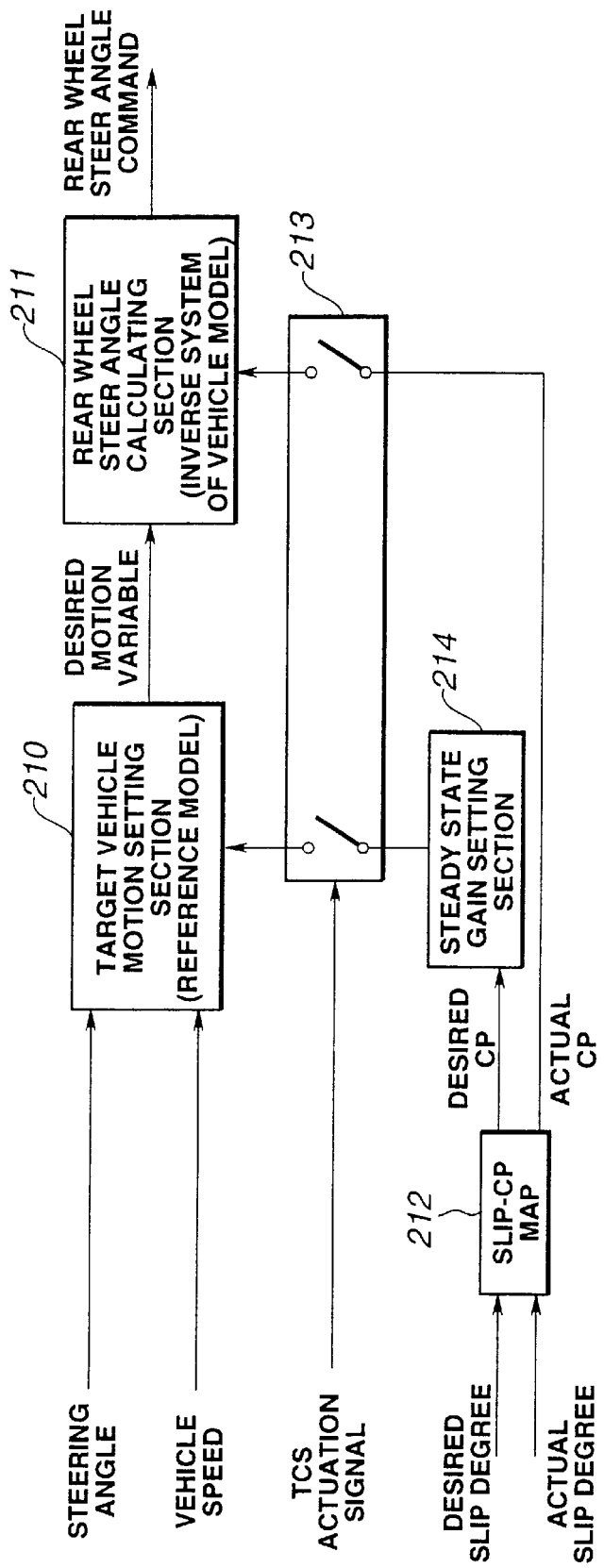
FIG. 9 is a block diagram showing a 4WS controlling system in an example according to the second embodiment corresponding to the second aspect of the present invention.

FIG. 9 shows a 4WS controlling system according to the second embodiment corresponding to the second aspect of the present invention shown in FIG. 2. The 4WS controlling system of this example is in the form of a program software system of the microcomputer 42.

The controlling system shown in FIG. 9 comprises a target vehicle motion setting section 210, a rear wheel steer angle calculating (or determining) section 211, and a map section 212. The target vehicle motion setting section 210 is a section for determining a value of a desired vehicle motion variable according to the reference model representing a vehicle response characteristic as intended by a designer, in the form of a mathematical model. These sections 210, 211 and 212 are substantially identical to the sections 110, 111 and 112 shown in FIG. 7, respectively.

The controlling system of FIG. 9 further comprises a constant altering switching section 213 connected with both the target motion setting section 210 and the rear wheel steer angle determining section 211, and a steady state gain setting section 214 for determining a desired steady state gain in accordance with a desired rear wheel slip degree sent from the TCS system. The switching section 213 is switched on by the TCS actuation signal. The steady state gain setting section 214 is arranged to reset the steady state gain in accordance with the desired rear wheel slip degree supplied from the TCS system.

In the target motion setting section 210 of this example, the desired motion characteristic given by the reference is expressed by the following equations (1) and (2).

$$\psi'^* = G^*\psi'(V) \cdot Gm(s) \cdot \theta(t) \quad (1)$$

$$G^*\psi'(V) = V/\{NL(1+AV^2)\} \quad (2)$$

$$A = (-M/2L^2) \cdot \{LF \cdot eKF - LR \cdot KR\}/eKF \cdot KR\}$$

In these equations, $\psi'^*$ is a desired yaw rate; $\theta$ is the steering angle, V is the vehicle speed; and M, L, LF, LR, N, eKF and KR are, respectively, a vehicle mass, a wheel base, a distance between the front wheels and the center of gravity, a distance between the rear wheels and the center of gravity, a steering gear ratio, an equivalent front wheel cornering power (CP) and a rear wheel cornering power of a target vehicle in a predetermined standard state. $G^*\psi'(V)$ is a desired steady state yaw rate gain at each vehicle speed, Gm(s) is a transient response characteristic intended by the designer, and s is a differential operator. When $G^*\psi'(V)$ is given as in the equation (2), the desired steady state yaw rate gain is set equal to a steady state yaw rate gain inherent in the target vehicle. It is possible to set the desired steady state yaw rate gain at a value unequal to the inherent steady state yaw rate gain of the target vehicle. In the following example, the desired steady state yaw rate gain is set equal to the inherent steady state yaw rate gain.

Figure 10:
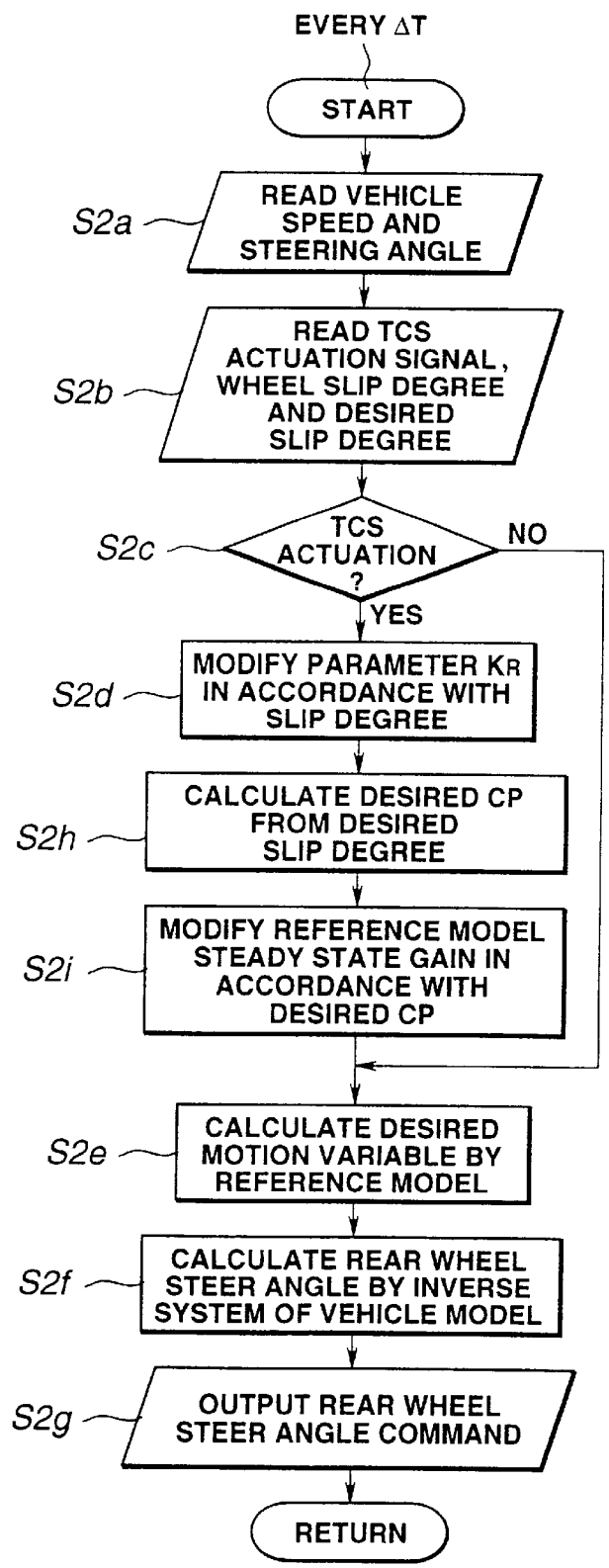
FIG. 10 is a flow chart showing a rear wheel steer angle control procedure performed by a 4WS controller in the example shown in FIG. 9 according to the second embodiment.

FIG. 10 shows a rear wheel steer angle control procedure performed by the 4WS controller 4 according to the second embodiment of the present invention.

At a step S2b, the controller 4 reads the desired slip degree as well as the TCS actuation signal and the wheel slip degree from the TCS controller 12.

At a step S2h, the controller 4 calculates the desired CP in accordance with the desired slip degree.

At a step S2i, the controller 4 modifies the reference model steady state gain in accordance with the desired CP.

The remaining steps are the same as the corresponding steps shown in FIG. 8.

In a normal running operation free from wheel spin, the flow of control is: Step S2a→Step S2b→Step S2c→Step S2d→Step S2e→Step S2f→Step S2g. The 4WS control system can achieve an vehicle behavior as intended by the designer.

When an excessive driving torque is applied by a driver's accelerator input and the TCS system is actuated, then the controller takes a route of Step S2a→Step S2b→Step S2c→Step S2d→Step S2h→Step S2i→Step S2e→Step S2f→Step S2g.

Thus, in accordance with the TCS actuation signal and the data on the desired rear wheel slip degree and the data on the actual rear wheel slip degree supplied from the TCS system, the 4WS system determines the rear wheel CP by using the slip versus CP relation map, and rewrites the rear wheel cornering power parameter KR in the rear wheel steer angle calculating section 211 (at the step S2d). Moreover, the steady state gain setting section 214 rewrites the desired steady state yaw rate gain $G^*\psi'(V)$ of the reference model by resetting the desired steady state gain as expressed by an equation (3) in accordance with the desired rear wheel CP (Steps S2h and S2i).

$$G^*\psi'(V) = V/\{NL(1+A^* \cdot V^2)\} \quad (3)$$

$$A^* = (-M/2L^2) \cdot \{LF \cdot eKF - LR \cdot KR^*\}/eKF \cdot KR^*\}$$

where KR* is the desired rear wheel CP obtained by the slip-CP map 212.

Then, the controller 4 performs the computation to determine the rear wheel steer angle by using the thus-reset desired steady state yaw rate gain and the actual rear wheel CP (Steps S2e and S2f). As a result, this system can prevent a fluctuation of the vehicle motion (such as the yaw rate) during the turning acceleration as shown by a broken line characteristic C2 in FIG. 17.

The control system according to the second embodiment is thus designed to reduce a steady state rear wheel steering amount required during acceleration during a turn by making a steady state gain of an actual vehicle characteristic used in the rear wheel steer angle calculating section 211 identical or closer to that of the target motion setting section 210. Therefore, it is optional to set the desired steady state gain equal to that of the actual vehicle, or to set it so as to be between the equations (2) and (3) within a controllable range of the rear wheel steering amount.

Figure 3:
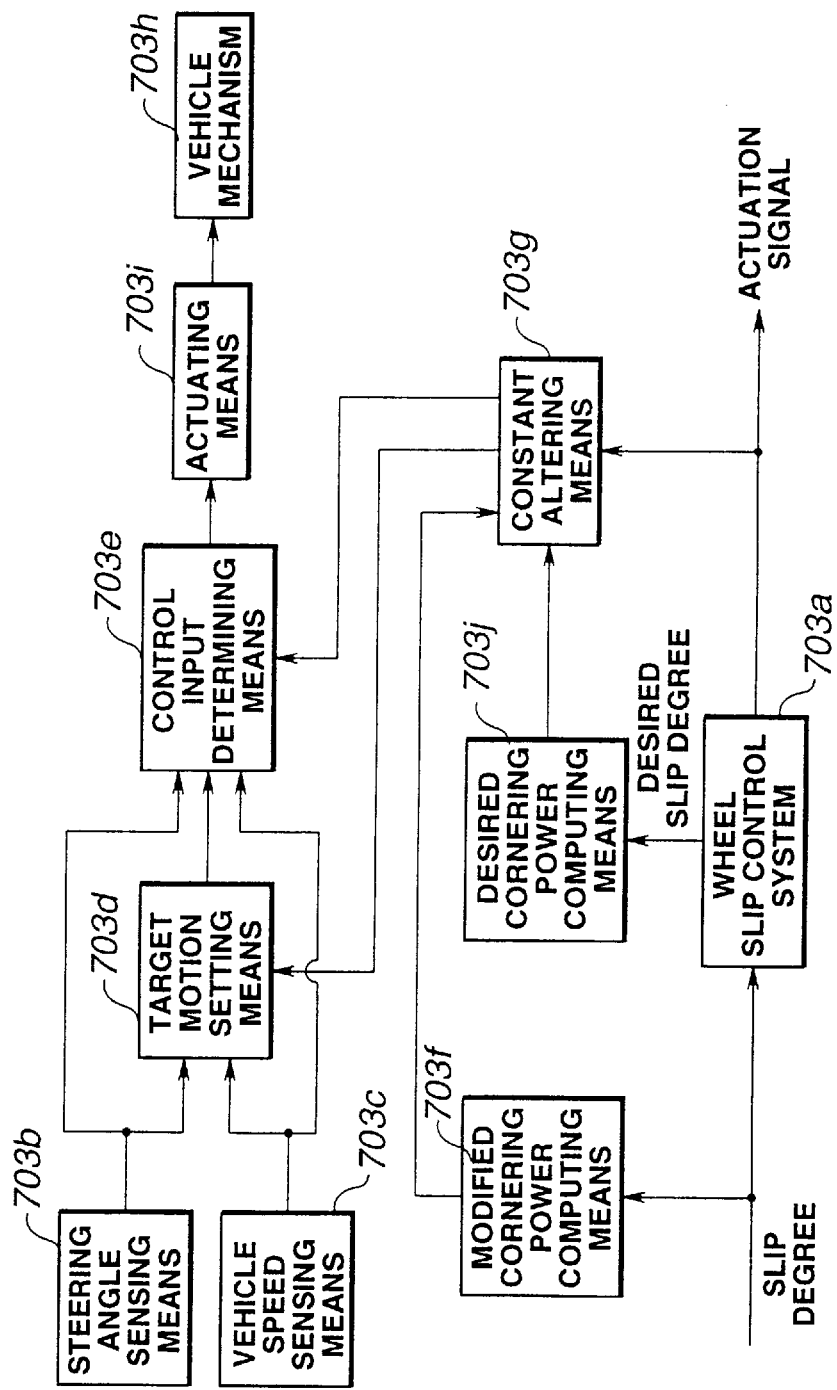
FIG. 3 is a block diagram schematically showing a vehicle control system according to a third aspect of the present invention.
Figure 11:
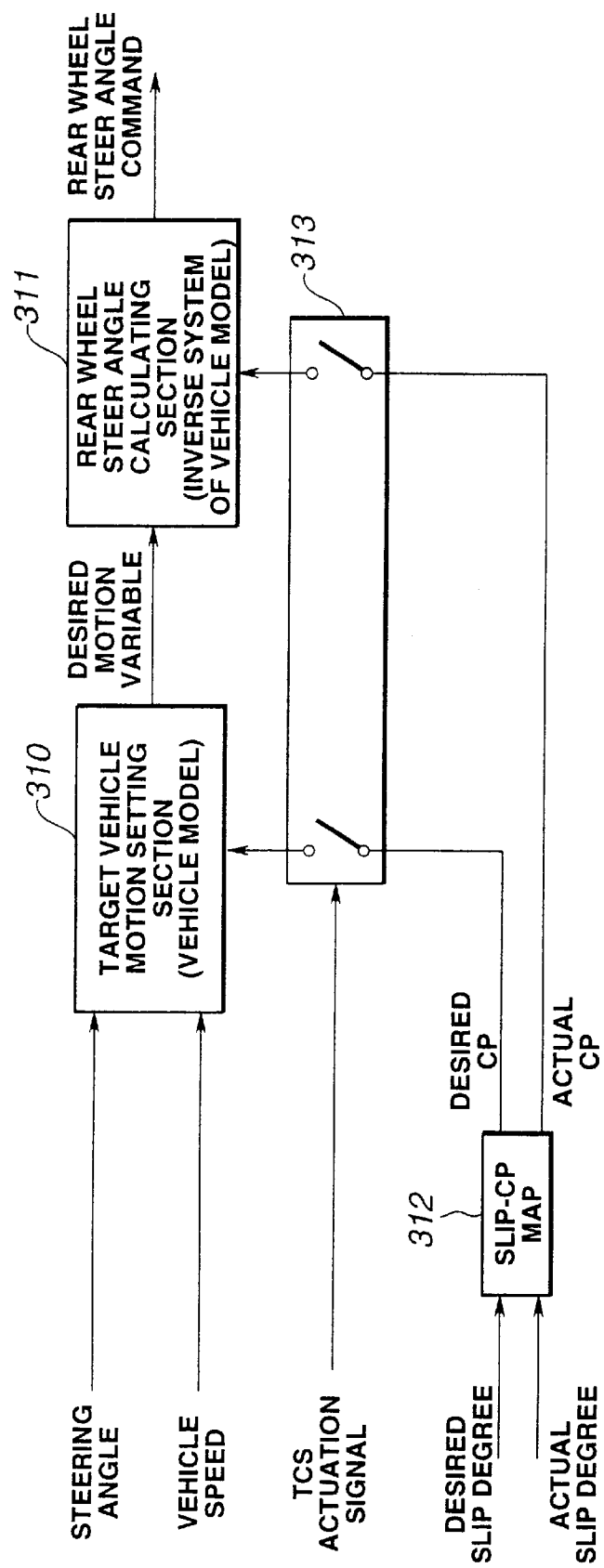
FIG. 11 is a block diagram showing a 4WS controlling system in an example according to the third embodiment corresponding to the third aspect of the present invention.

FIG. 11 shows a 4WS controlling system according to the third embodiment corresponding to the third aspect of the present invention shown in FIG. 3. The 4WS controlling system of this example is in the form of a system of program software in the microcomputer 42.

As shown in FIG. 11, the controlling system comprises a target vehicle motion setting section 310, a rear wheel steer angle calculating section 311, a slip-CP map section 312 and a constant altering switch section 313.

The target vehicle motion setting section 310 has a vehicle model representing a vehicle motion characteristic in a standard state. The steering angle, the vehicle speed and the desired motion variable set by the target motion setting section 310 are inputted to the rear wheel steer angle calculating section 311. In accordance with these input signals, the rear wheel steer angle calculating section 311 computes a rear wheel steer angle required to achieve the desired motion variable by performing an inverse mathematical operation of at least one equation of motion including constants (or parameters) representing vehicle specification data items of the controlled vehicle. The map section 312 stores a slip-CP map similar to that in the first embodiment and determines CP from the slip degree. The switch section 313 is turned on by the TCS actuation signal as in the second embodiment.

Figure 12:
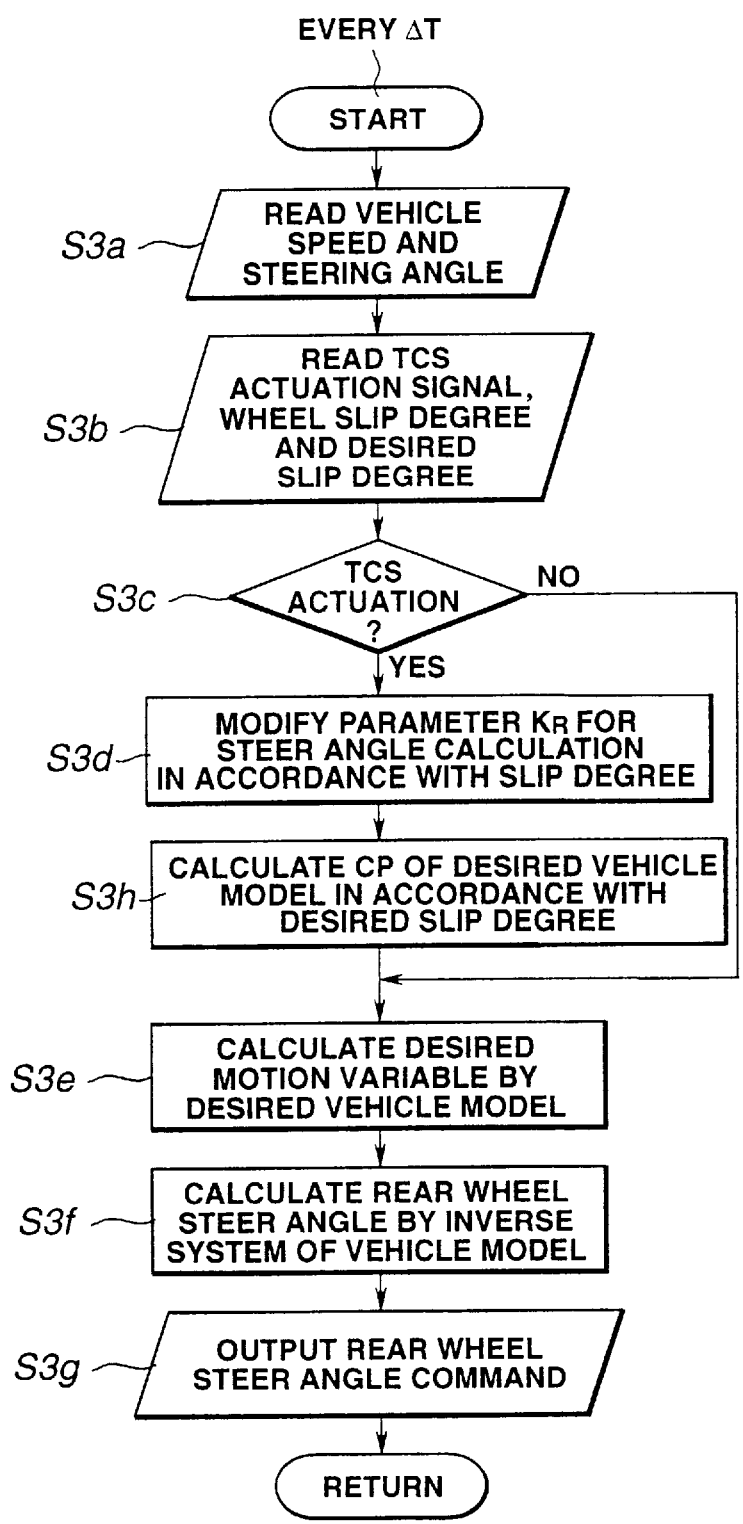
FIG. 12 is a flow chart showing a rear wheel steer angle control procedure performed by a 4WS controller in the example shown in FIG. 11 according to the third embodiment.

FIG. 12 shows a rear wheel steer angle control procedure performed by the 4WS controller according to the third embodiment of the present invention.

At a step S3e, the controller 4 calculates the desired vehicle motion variable by using the desired vehicle model.

The remaining steps are substantially identical to the corresponding steps shown in FIG. 8 or 10.

In the normal running operation free from wheel spin, the flow of control is: Step S3a→Step S3b→Step S3c→Step S3e→Step S3f→Step S3g. In this example, the target vehicle motion setting section 310 and the rear wheel steer angle calculating section 311 use the same vehicle parameters (vehicle constants) representing the vehicle specification data items. Therefore, the rear wheel steer angle is held equal to zero in this normal running operation.

When an excessive driving torque is applied by a driver's accelerator input and the TCS system is in control operation, then the controller follows Step S3a→Step S3b→Step S3c→Step S3d→Step S3h→Step S3e→Step S3f→Step S3g.

Thus, the 4WS control system receives the TCS actuation signal, the data signal representing the desired rear wheel slip degree and the data signal representing the actual rear wheel slip degree transferred from the TCS system, and determines the desired rear wheel cornering power CP and the actual rear wheel cornering power CP by using the slip-CP map of the map section 312 in accordance with these signals from the TCS system. Then, the 4WS system rewrites the rear wheel cornering power representing parameter (or constant) KR of the rear wheel steer angle calculating section 311 in accordance with the actual rear wheel cornering power, and rewrites the rear wheel cornering power representing parameter (or constant) of the target motion setting section 310 in accordance with the desired rear wheel cornering power. By using the thus-modified rear wheel cornering power parameters, the 4WS system calculates the required rear wheel steer angle and producing the control signal representing the required rear wheel steer angle.

Figure 17:
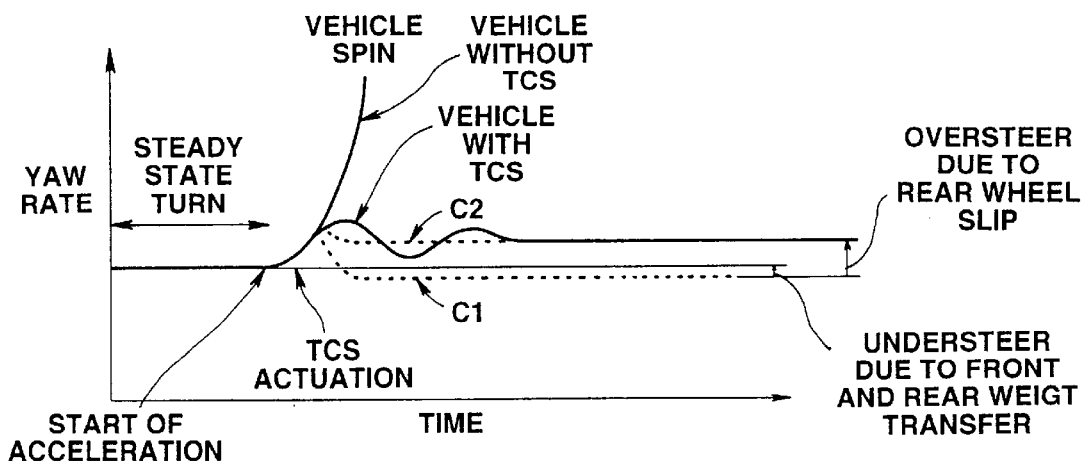
FIG. 17 is a graph of a yaw rate characteristic for illustrating effects obtained in each embodiment of the present invention.

As a result, the 4WS system can prevent fluctuation of the vehicle motion (such as the yaw rate) as shown by a broken line characteristic C2 in FIG. 17 while the vehicle is being turned and accelerated simultaneously.

The control system according to the third embodiment is thus designed to reduce a steady state rear wheel steering amount required during acceleration during a turn by making the steady state gain of an actual vehicle characteristic used in the rear wheel steer angle calculating section 311 identical or closer to that of the target motion setting section 310 as in the system according to the second embodiment. Therefore, it is optional to use the desired CP directly as the rear wheel CP used in the target motion setting section 310 as explained above, or to set the rear wheel CP so as to be intermediate between the desired CP and the CP in the standard state within a controllable range of the rear wheel steering amount.

Figure 4:
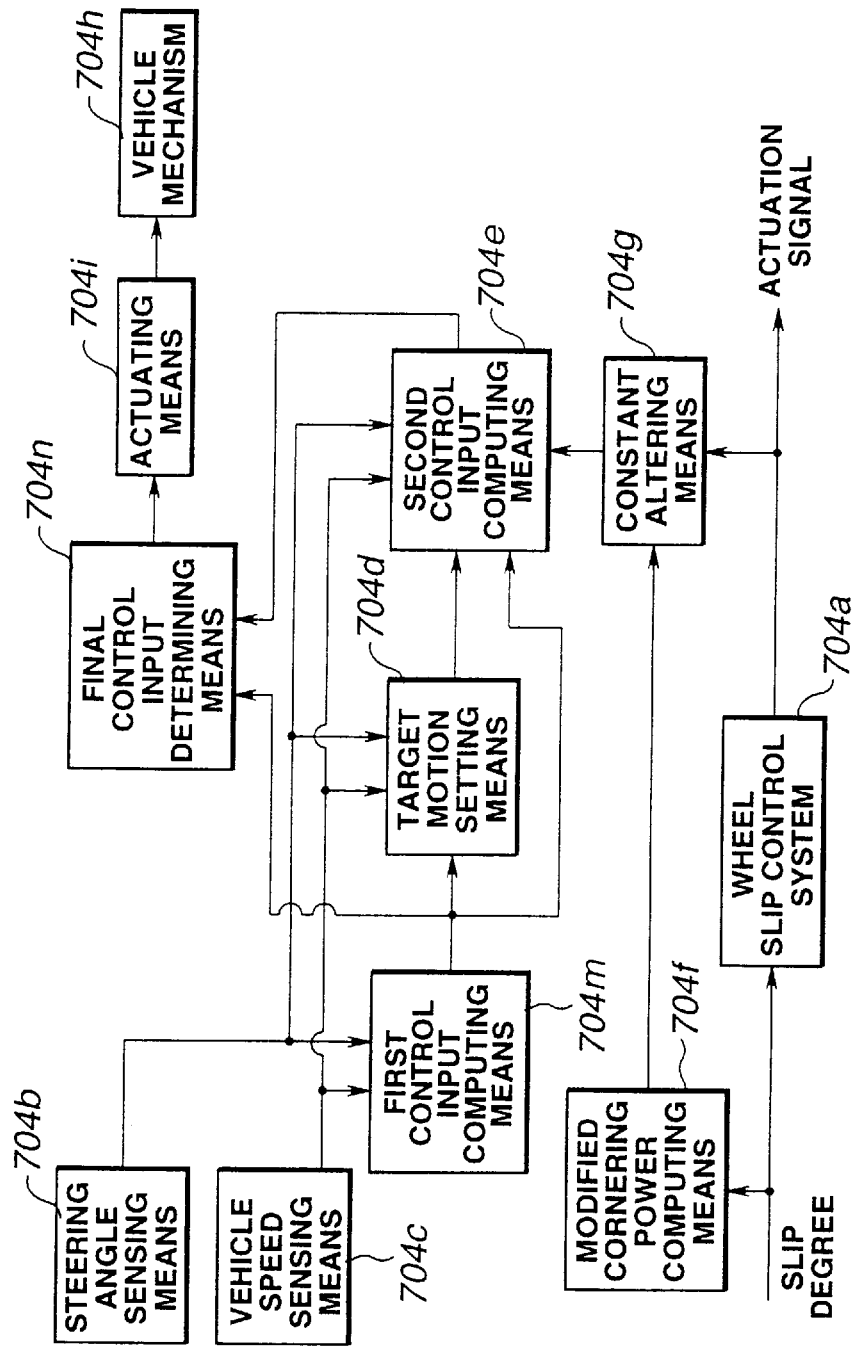
FIG. 4 is a block diagram schematically showing a vehicle control system according to a fourth aspect of the present invention.
Figure 5:
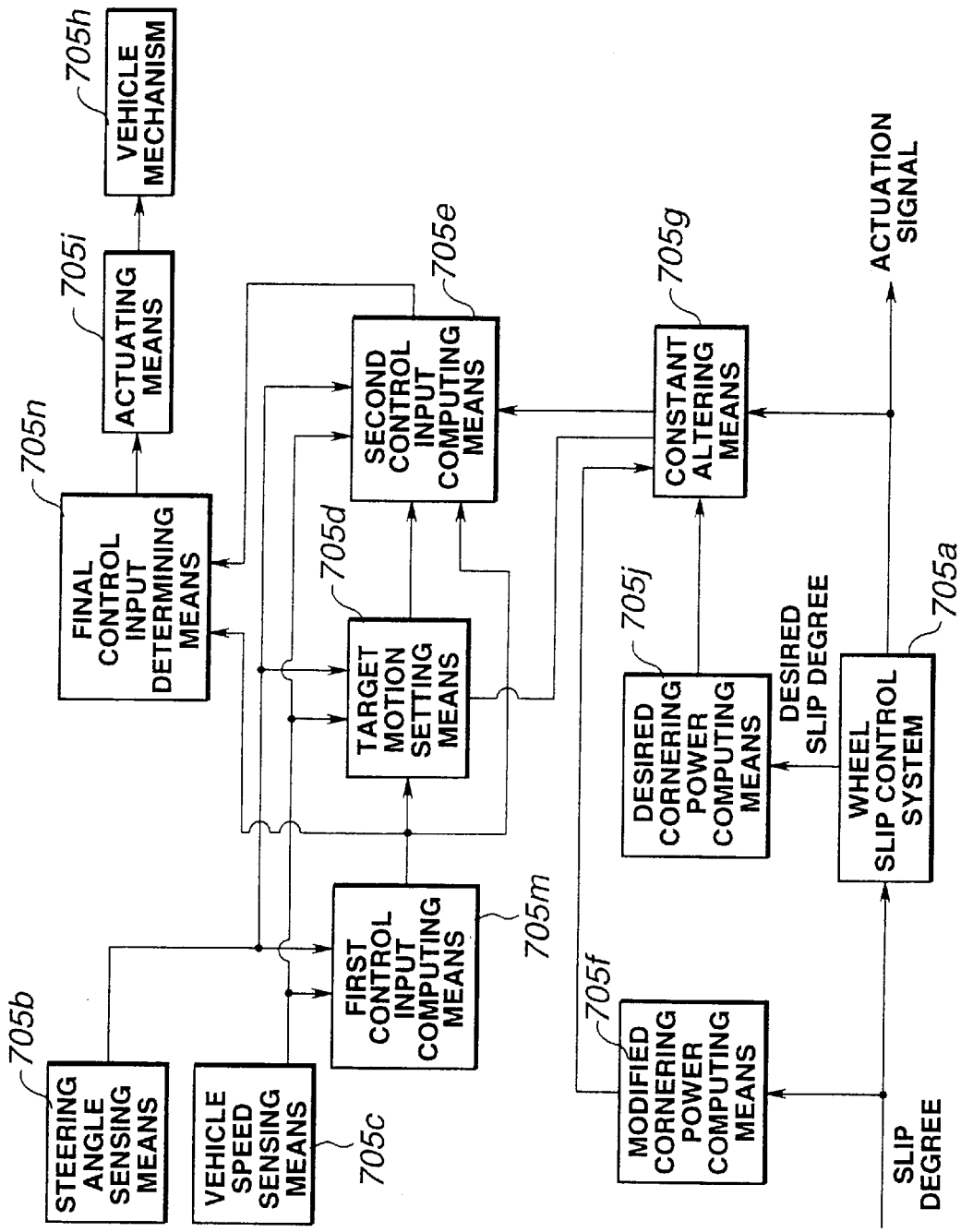
FIG. 5 is a block diagram schematically showing a vehicle control system according to a fifth aspect of the present invention.
Figure 13:
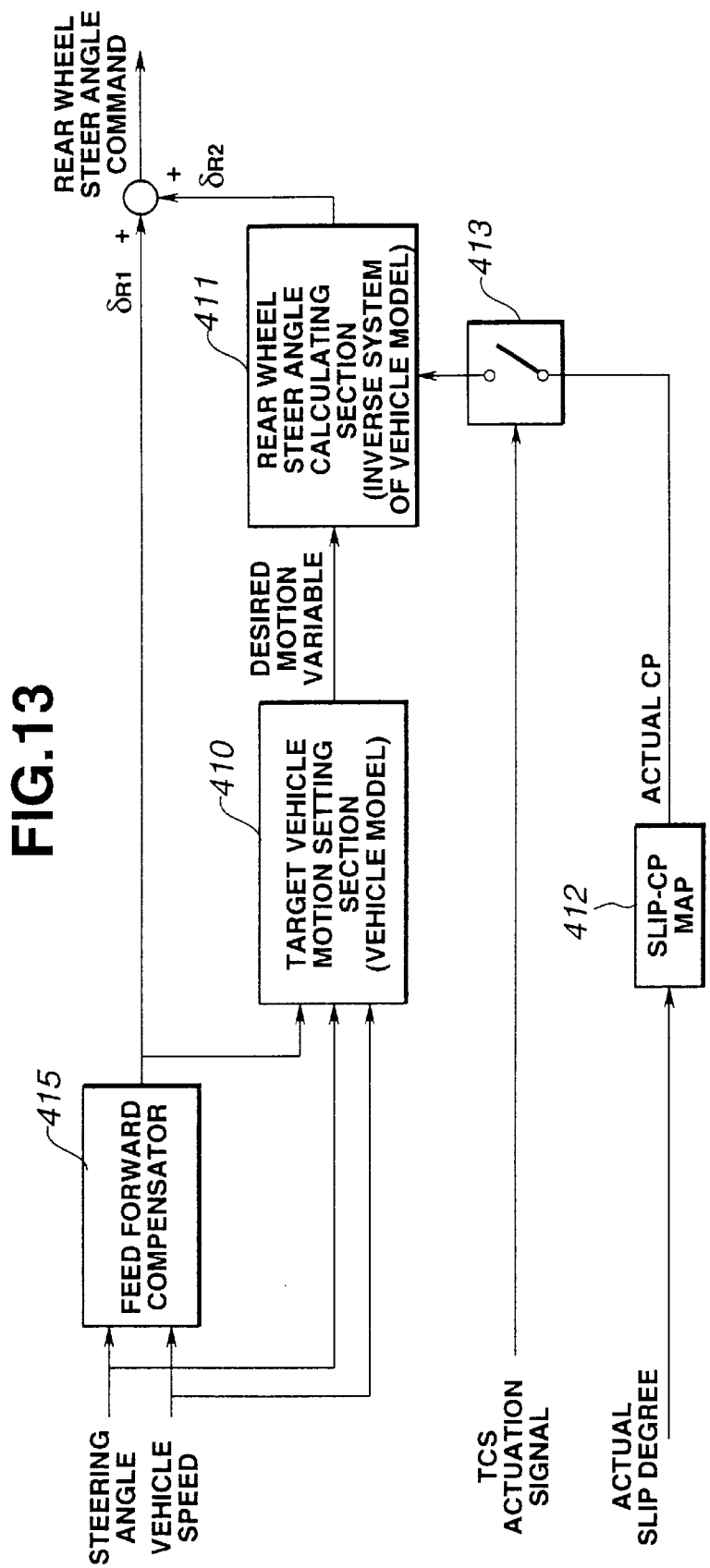
FIG. 13 is a block diagram showing a 4WS controlling system in an example according to the fourth embodiment corresponding to the fourth aspect of the present invention.

FIG. 13 shows a 4WS controlling system according to the fourth embodiment corresponding to the fourth aspect of the present invention shown in FIG. 4. In this example, the 4WS controlling system is arranged as program software performed by the microcomputer 42.

The 4WS controlling system shown in FIG. 13 comprises a feed-forward compensator 415, a target vehicle motion setting section 410, a rear wheel steer angle calculating section 411, a slip-CP map section 412 and a constant altering switch section 413.

The feed-forward compensator 415 is a section for receiving the steering angle and the vehicle speed, and for computing a first rear wheel steer angle (or primary rear wheel steer angle) $\delta R1$ in accordance with a predetermined control function. In this example, the predetermined control function is:

$$\delta R1 = K(v) \cdot \theta(t) + \tau(V) \cdot \theta'(t) + \tau'(V) \cdot \theta''(t) \quad (4)$$

where $\theta'$ is a first order derivative of the steering angle $\theta$, $\theta''$ is a second order derivative of the steering angle, and K(V), $\tau(V)$ and $\tau'(V)$ are, respectively, predetermined control constants preliminarily determined so as to provide a desired vehicle behavior in the standard state. Each of these control constants is a function of the vehicle speed V.

The target motion setting section 410 receives the steering angle, the vehicle speed and the first rear wheel steer angle $\delta R1$. By using these input signals, the target motion setting section 410 estimates the desired vehicle motion such as the desired yaw rate according to a vehicle model representing a vehicle motion characteristic in a standard state. The rear wheel steer angle calculating section 411 receives the steering angle, the vehicle speed, the first rear wheel steer angle $\delta R1$ and the desired vehicle motion variable determined by the target motion setting section 410, and determines a second rear wheel steer angle (secondary rear wheel steer angle) $\delta R2$ to achieve the desired motion variable by inverse mathematical operation of at least one equation of motion using the vehicle constants (or vehicle parameters) of the controlled vehicle. At a summing point shown in FIG. 13, the 4WS controlling system adds the first and second rear wheel steer angles $\delta R1$ and $\delta R2$, and produce a rear wheel steer angle command signal representing the sum $\delta R^*$ of the first and second rear wheel steer angles. Normally, each of the rear wheel cornering constants used in the sections 410 and 411 is set equal to a rear wheel cornering power value at a constant operation (in which the slip degree is approximately equal to zero). The map section 412 stores a slip-CP map representing a relationship shown by a broken line in FIG. 18. The switch section 413 is switched on by the TCS actuation signal.

Figure 14:
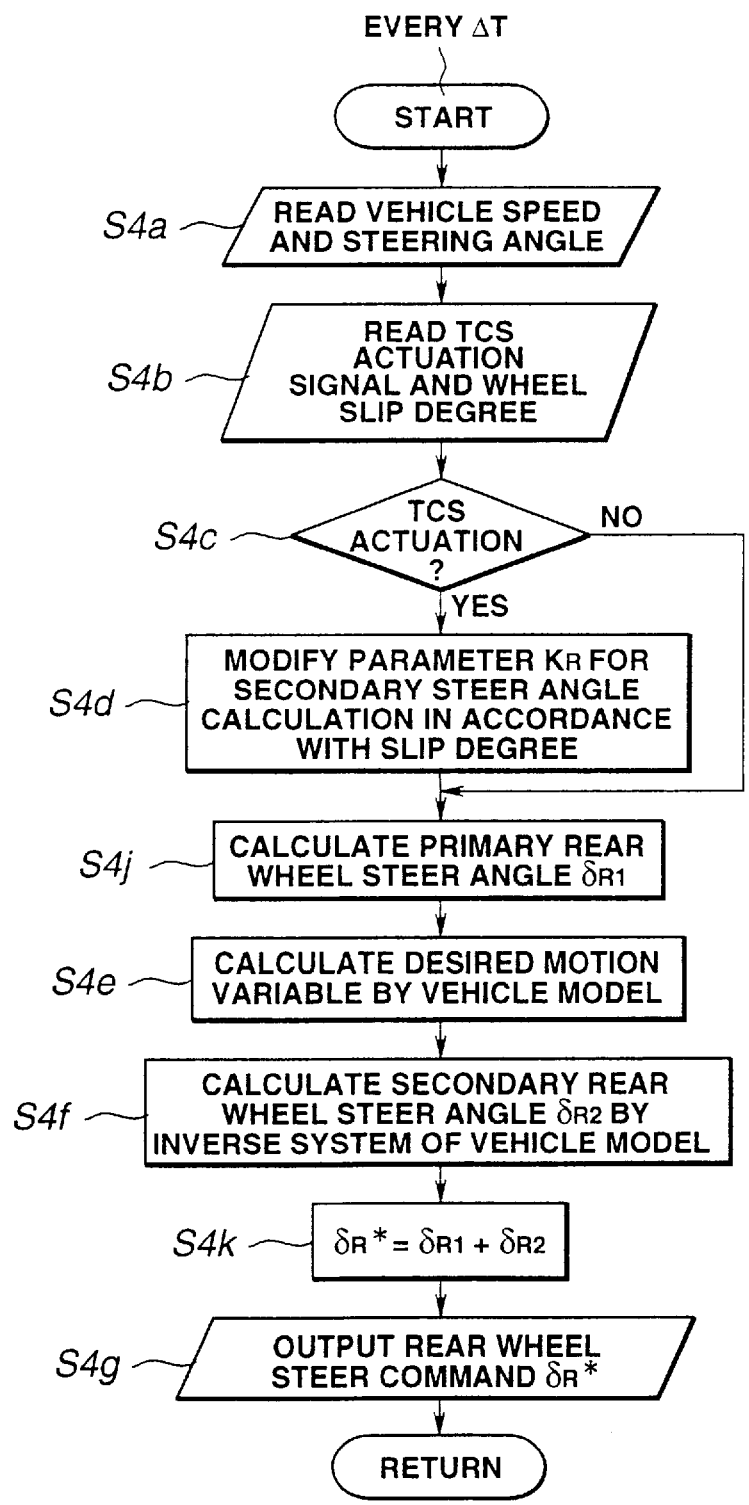
FIG. 14 is a flow chart showing a rear wheel steer angle control procedure performed by a 4WS controller in the example shown in FIG. 13 according to the fourth embodiment.

FIG. 14 shows a rear wheel steer angle control procedure performed by the 4WS controller 4 according to the fourth embodiment.

At a step S4j, the controller 4 calculates the primary (first) rear wheel steer angle $\delta R1$.

At a step S4f, the controller 4 calculates the secondary rear wheel steer angle $\delta R2$.

At a step S4k, the controller 4 calculates the rear wheel steer angle command magnitude $\delta R^*$ by using an equation; $\delta R^* = \delta R1 + \delta R2$.

The other steps are substantially identical to the corresponding steps of FIG. 8.

In the normal running operation exempt from wheel spin, the flow of control is: Step S4a→Step S4b→Step S4c→Step S4j→Step S4e→Step S4f→Step S4k→Step S4g. In this example, the target vehicle motion setting section 410 and the rear wheel steer angle calculating section 411 use the same vehicle parameters (vehicle constants) representing the vehicle specification data items. Therefore, the second rear wheel steer angle is held equal to zero ($\delta R2=0$) in this normal running operation. This control system controls the vehicle only with the primary rear wheel steer angle $\delta R1$ determined by the feedforward compensating section 415.

When an excessive driving torque is applied by a driver's accelerator input and the TCS system is in control operation, then the sequence followed by the controller is: Step S4a→Step S4b→Step S4c→Step S4d→Step S4j→Step S4e→Step S4f→Step S4k→Step S4g.

Thus, the 4WS control system receives the TCS actuation signal, and the data signal representing the wheel slip degree transferred from the TCS system, and determines the rear wheel cornering power CP by using the slip-CP map of the map section 412 in accordance with these signals from the TCS system. Then, the 4WS system rewrites the rear wheel cornering power representing parameter (or constant) KR of the rear wheel steer angle calculating section 411 in accordance with the rear wheel cornering power (Step S4d). By using the thus-modified rear wheel cornering power parameter, the 4WS system calculates the required second rear wheel steer angle δR2 (Step S4f), and producing the rear wheel steer angle command signal representing the sum of the first and second rear wheel steer angles δR1 and δR2 (Steps S4k and S4g).

As a result, the 4WS system can prevent fluctuation of the vehicle motion (such as the yaw rate) as shown by a broken line characteristic C1 in FIG. 17 when the vehicle is turned and accelerated simultaneously.

FIG. shows a 4WS controlling system according to a fifth embodiment corresponding to the fifth aspect of the present invention. In this example, the 4WS controlling system is arranged as program software performed by the microcomputer 42.

Figure 15:
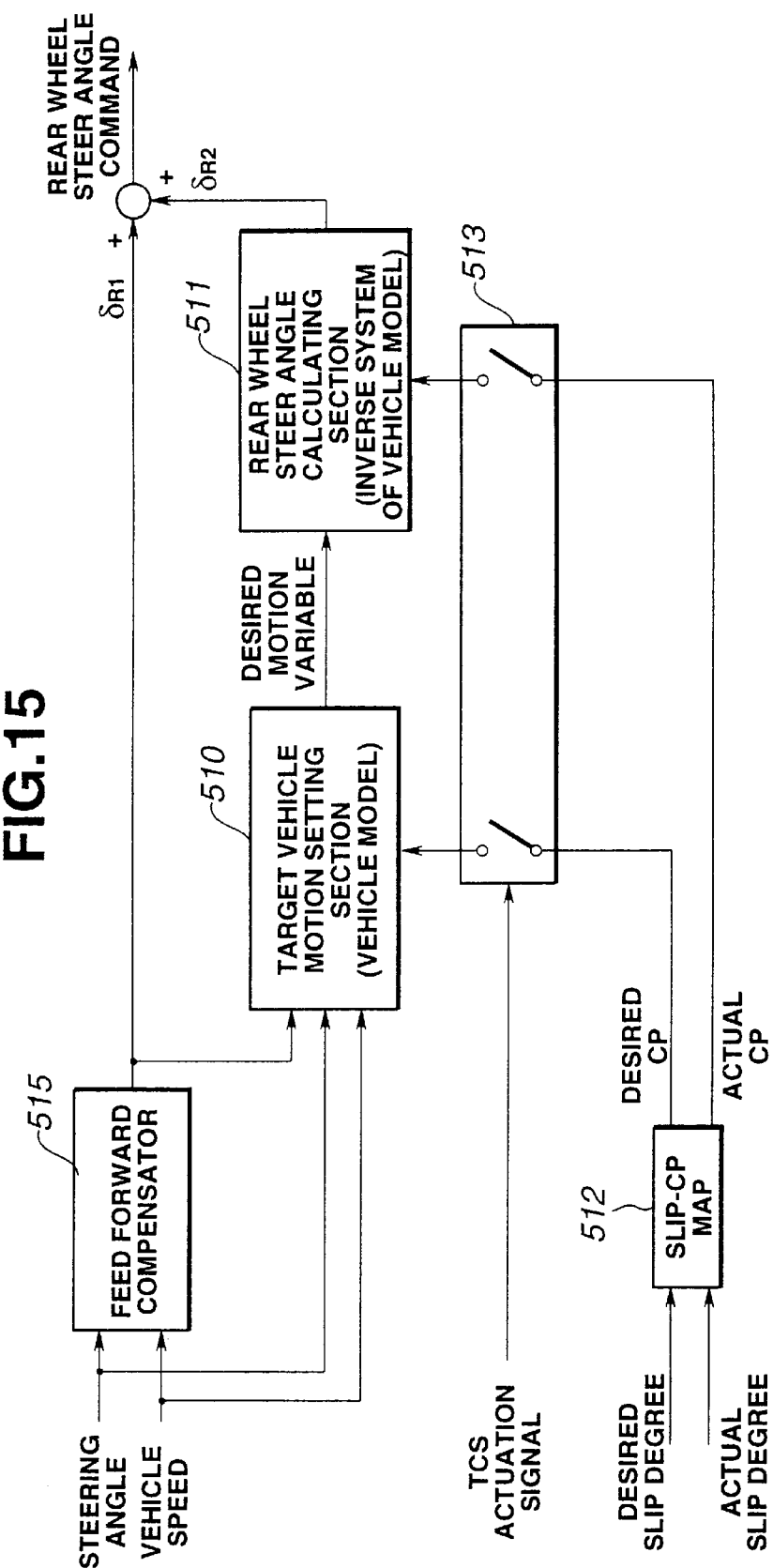
FIG. 15 is a block diagram showing a 4WS controlling system in an example according to the fifth embodiment corresponding to the fifth aspect of the present invention.

The 4WS controlling system shown in FIG. 15 comprises a feed-forward compensator 515, a target vehicle motion setting section 510, a rear wheel steer angle calculating section 511, a slip-CP map section 512 and a constant altering switch section 513.

The feed-forward compensator 515 is a section for receiving the steering angle and the vehicle speed, and for computing a first rear wheel steer angle (or primary rear wheel steer angle) δR1 in accordance with a predetermined control function like the feed-forward compensator 415 of FIG. 13. The target motion setting section 510 determines the desired vehicle motion such as the desired yaw rate according to a vehicle model representing a vehicle motion characteristic in a standard state. The rear wheel steer angle calculating section 511 determines a second rear wheel steer angle (secondary rear wheel steer angle) δR2 to achieve the desired motion variable by inverse mathematical operation of at least one equation of motion using the vehicle constants of the controlled vehicle. The map section 512 is a slip-CP map similar to that of the first embodiment. The switch section 513 is switched on by the TCS actuation signal as in the second embodiment.

Figure 16:
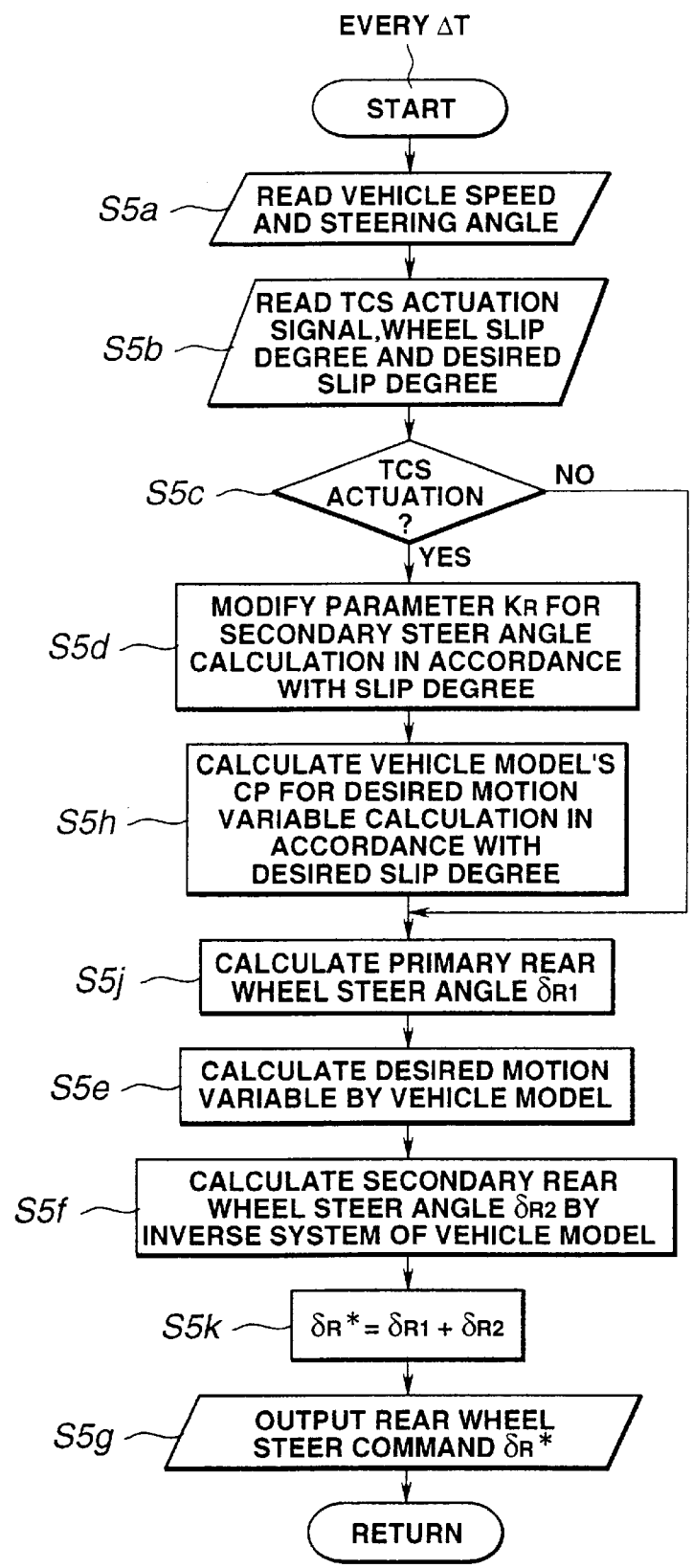
FIG. 16 is a flow chart showing a rear wheel steer angle control procedure performed by a 4WS controller in the example shown in FIG. 15 according to the fifth embodiment.

FIG. 16 shows a rear wheel steer angle control procedure performed by the 4WS controller 4 according to the fifth embodiment. The steps are similar to the corresponding steps shown in FIG. 12 or FIG. 14.

In the normal running operation free from wheel spin, the flow of control is: Step S5a→Step S5b→Step S5c→Step S5j→Step S5e→Step S5f→Step S5k→Step S5g. In this example, the target vehicle motion setting section 510 and the rear wheel steer angle calculating section 511 use the same vehicle parameters (vehicle constants) representing the vehicle specification data items. Therefore, the second rear wheel steer angle is held equal to zero (δR2=0) in this normal running operation. This control system controls the vehicle only with the primary rear wheel steer angle δR1 determined by the feed forward compensating section 515.

When an excessive driving torque is applied by a driver's accelerator input and the TCS system is in control operation, then the sequence followed by the controller is: Step S5a→Step S5b→Step S5c→Step S5d→Step S5h→Step S5j→Step S5e→Step SSf→Step S5k→Step S5g.

Thus, the 4WS control system receives the TCS actuation signal, the data signal representing the desired rear wheel slip degree and the data signal representing the actual rear wheel slip degree transferred from the TCS system, and determines the desired rear wheel cornering power CP and the actual rear wheel cornering power CP by using the slip-CP map of the map section 512 in accordance with these signals from the TCS system. Then, the 4WS system rewrites the rear wheel cornering power representing parameter (or constant) KR of the rear wheel steer angle calculating section 511 in accordance with the actual rear wheel cornering power, and rewrites the rear wheel cornering power representing parameter (or constant) of the target motion setting section 510 in accordance with the desired rear wheel cornering power (Steps S5d, S5h). By using the thus-modified rear wheel cornering power parameters, the 4WS system calculates the required second rear wheel steer angle δR2 (Step S4e, S4f), and producing the rear wheel steer angle command signal representing the sum δR* of the first and second rear wheel steer angles δR1 and δR2 (Steps S5k and S5g).

As a result, the 4WS system can prevent fluctuation of the vehicle motion (such as the yaw rate) as shown by the broken line characteristic C2 in FIG. 17 when the vehicle is accelerated during a turn.

The control system according to the fifth embodiment is thus designed to reduce a steady state rear wheel steering amount required in an accelerating operation during a turn by making a steady state gain of an actual vehicle characteristic used in the rear wheel steer angle calculating section 511 equal or closer to that of the target motion setting section 510 like the second and third embodiments, in addition to the first and fourth embodiments. Therefore, it is optional to use the desired CP directly as the rear wheel CP used in the target motion setting section 510 as explained above, or to set the rear wheel CP so as to be intermediate between the desired CP and the CP in the standard state within a controllable range of the rear wheel steering amount.

As explained above, the control system according to each embodiment of the present invention can prevent the TCS control from causing the drive wheel slip degree to repeat overshoot and undershoot on both sides of the desired slip degree, and from causing the vehicle motion such as the yaw rate to be fluctuated by the change of the drive wheel cornering power, and enable a stable cornering acceleration. The systems according to the first and fourth embodiments can provide the broken line characteristic C1 of FIG. 17, and the systems according to the second, third and fifth embodiments can provide the broken line characteristic C2 in FIG. 17.

In the systems according to the second, third and fifth embodiment, the desired slip degree is transferred from the TCS system to the 4WS system in addition to the actual drive wheel slip. In accordance with this desired slip degree, the steady state characteristic of the desired vehicle is made closer to the steady state characteristic of the actual vehicle in the state in which the drive wheel slip appears. Therefore, these control systems can provide a satisfactory transient characteristic without the need for a large rear wheel steer angle.

The present invention is not limited to the illustrated examples. The present invention can be embodied in various manners. For example, the TCS system is arranged to predict an TCS operation by utilizing a wheel slip parameter such as a derivative of the slip degree (or a time rate of change of the drive wheel slip degree) in the calculation of the slip degree, and the 4WS system is arranged to initiate the operation to change the vehicle constant earlier. In this case, the control system can make the actual vehicle characteristic closer to a broken line characteristic shown in FIG. 18.

In the illustrated examples, the drive wheel cornering power is modified for all the drive wheels. However, it is optional to modify the cornering power of each wheel in accordance with the slip degree of that wheel. By modifying the cornering powers individually in this way, it is possible to improve a theoretical accuracy.

The example shown in FIG. 6 employs the TCS controller 12 and the 4WS controller 4. However, it is possible to employ a single microcomputer which can serve as both of the TCS controller 12 and the 4WS controller 4.

In the illustrated examples, the vehicle motion is controlled by controlling the rear wheel steer angle. However, in the present invention, it is possible to control the vehicle motion by controlling a front wheel steer angle with a front wheel steering actuator in combination with, or solely without, a convention front wheel steering linkage, or by controlling both the front wheel steer angle and the rear wheel steer angle. It is further possible to control the vehicle motion by controlling a driving force distribution between the left and right drive wheels with a left and right driving force distribution control system, or by controlling a braking force distribution between left and right wheels with a left and fight braking force distribution control system.

In the illustrated examples according to the present invention, a vehicle, that is a controlled vehicle, may comprise a first chassis system or mechanism (such as a drive system and a brake system) for applying a driving force (or torque) or a braking force (or torque) to one or more forced wheels (such as driven wheels) of said controlled vehicle to increase and decrease the vehicle speed; a second chassis system or mechanism which, in the illustrated examples, is a steering system or mechanism generally comprising a steering wheel for receiving a driver's steering input, a wheel spinning condition sensing means (such as items 11) for sensing a spinning condition of one or more monitored wheels of said controlled vehicle; a steering input sensing means (such as item 3) for sensing a steering input which is applied by the driver of said controlled vehicle and which may be a steering wheel angle, a front wheel angle or a displacement of a movable element of a steering mechanism connected with the steering wheel; a vehicle speed sensing means (such as item 2); a wheel slip control actuator (such as items 14, 15 or 17) for controlling the driving or braking force (or torque) applied by said first vehicle system to control a wheel slip of said forced wheels in response to a wheel slip control signal; a vehicle motion control actuator (such as the steering actuator 5) for varying a steering response of said controlled vehicle in accordance with a vehicle motion control signal by varying a steer angle of one or more steered wheels of said controlled vehicle or by varying at least one of a front wheel steer angle and a rear wheel steer angle or by varying some other manipulated variable of said controlled vehicle; and a controlling means (such as items 4, 12, 13 or 16) for producing said wheel slip control signal in accordance with the sensed actual wheel condition, and producing said vehicle motion control signal in accordance with the sensed actual steering input and the sensed actual vehicle speed. The controlling means normally sets said cornering power constant of said inverse model equal to a normal value, and decreases said cornering power constant of said inverse model in accordance with said actual wheel spinning condition during a time interval during which said wheel slip control operation is being performed to control said actual wheel slip condition.

The controlling means may comprise a wheel slip controller means (such as item 12) for determining a wheel slip parameter indicative of wheel slip in accordance with the sensed actual wheel condition, and generating said wheel slip control signal. In the illustrated examples of the invention, the wheel slip controller means further generates an actuation signal when said wheel slip parameter is in a predetermined condition. The wheel slip parameter may be a degree of wheel slip or a time rate of change of the degree of wheel slip. For example, the wheel slip controller means may produce the wheel slip control signal and the actuation signals simultaneously when the degree of wheel slip becomes equal to or higher than a predetermined threshold value. The wheel slip control signal may be generated, for example, so as to reduce a deviation of the wheel slip degree from a predetermined desired slip degree when the monitored wheel is in a predetermined condition. The wheel slip controller means and the wheel slip control actuator may constitute a traction control system which may take the form of one of conventional traction control systems.

The controlling means may further comprise a steering controller means (such as item 42) for producing said vehicle motion control signal in the form of a steering control signal, in accordance with the actual wheel slip degree, the actual steering angle and the actual vehicle speed, The steering controller means may comprise a storage means for storing an input-to-response mathematical model for determining a value of a desired vehicle steering response corresponding to a given value of the steering input and a given value of a vehicle speed, and an inverse (or response-to-input) mathematical model for determining a value a required steering control input corresponding to a given value of the desired vehicle steering response. The inverse model may comprise a group of vehicle constants representing vehicle specification data items which are characteristic of said controlled vehicle and which specify the steering characteristic of said controlled vehicle. The group of vehicle constants may comprise a cornering power constant representing a cornering power (or cornering stiffness) of said controlled vehicle which may be the cornering power of said forced wheels or the drive wheel cornering power.

The steering controller means may further comprise a processing means for determining a target vehicle steering response by solving said input-to-response mathematical model by substituting the sensed actual steering input and the sensed actual vehicle speed into said input-to-response model, for determining the required steering control input by solving said inverse mathematical model by substituting the sensed actual steering input, the sensed actual vehicle speed and said target vehicle response into said inverse model, for adjusting said cornering power constant of said inverse model in accordance with the sensed actual wheel slip degree at least when said wheel slip control system is in (control) operation or in response to the actuation signal, and for producing said steering control signal representing said required steering control input.

The steering controller means may comprise an onboard microcomputer having a central processing unit and a memory section. The microcomputer may be connected with an external storage device. It is optional to regard the storage means as being corresponding to the memory section and/or the storage device, and the processing means as being corresponding to the central processing unit.

The degree of wheel slip may be in the form of a slip rate (or slip ratio) or a percent slip. The wheel slip control system may be arranged to produce the TCS actuation signal by monitoring the wheel slip parameter which is at least one of the wheel slip degree and the time rate of change of the wheel slip degree.

What is claimed is:

1. A vehicle motion control system comprising:
   a wheel slip control system for sensing a wheel slip and controlling a wheel slip degree toward a desired slip degree;
   a steering angle sensing means for sensing a steering input representing a steering angle;
   a vehicle speed sensing means for sensing a vehicle speed;

a target vehicle motion setting means for receiving a steering input signal representing said steering input and a vehicle speed signal representing said vehicle speed, and determining a desired vehicle motion variable by using a first model which is one of a reference mathematical model representing a desired dynamic characteristic and a vehicle model described by an equation of motion;

a control input determining means for receiving said steering input, said vehicle speed and said desired motion variable, and determining a control input command to make an actual vehicle motion closer to said desired motion variable by using an inverse vehicle model for an inverse operation of an equation of vehicle motion, said inverse model being determined by vehicle specification data items of a controlled vehicle;

a modified cornering power determining means for receiving the wheel slip degree detected by said wheel slip control system, and determining a modified value of a cornering power constant which represents a cornering power and which is one of said vehicle specification data items of said controlled vehicle, in accordance with said wheel slip degree;

a constant altering means for changing said cornering power constant of said control input determining means to said modified value of said cornering power constant in response to an actuation signal of said wheel slip control system; and an actuating means for controlling a behavior of said controlled vehicle in accordance with said control input command.

2. A vehicle motion control system according to claim 1 wherein said wheel slip control system is a traction control system for preventing a wheel idling by decreasing an engine output.

3. A vehicle motion control system according to claim 1 wherein said controlled vehicle is a rear wheel drive vehicle, and said cornering power constant is a rear wheel cornering power constant representing a rear wheel cornering power.

4. A vehicle motion control system according to claim 1 wherein said control input is at least one of a rear wheel steer angle and a front wheel auxiliary steer angle.

5. A vehicle motion control system according to claim 1, wherein said wheel slip control system includes:

a wheel speed sensing means for sensing a drive wheel speed of the vehicle and a non-drive wheel speed of the vehicle; and a wheel slip controlling means for determining the wheel slip degree from the drive wheel speed and the non-drive wheel speed and controlling the wheel slip degree toward the desired slip degree by controlling at least one of a driving force and a braking force of the vehicle.

6. A vehicle motion control system comprising:

a wheel slip control system for sensing a wheel slip and controlling a wheel slip degree toward a desired slip degree;

a steering angle sensing means for sensing a steering input representing a steering angle;

a vehicle speed sensing means for sensing a vehicle speed;

a target vehicle motion setting means for receiving a steering input signal representing said steering input and a vehicle speed signal representing said vehicle speed, and determining a desired vehicle motion variable by using a first model which is one of a reference mathematical model simulating a desired dynamic characteristic and a vehicle model comprising an equation of motion;

a control input determining means for receiving said steering input, said vehicle speed and said desired motion variable, and determining a control input command to make an actual vehicle motion closer to said desired motion variable by using an inverse model for an inverse operation of an equation of vehicle motion, said inverse model being determined by vehicle specification data items of a controlled vehicle;

a modified cornering power determining means for receiving the wheel slip degree detected by said wheel slip control system, and determining a modified value of a cornering power representing constant which is one of said vehicle specification data items of said controlled vehicle, in accordance with said wheel slip degree;

a desired cornering power computing means for receiving a desired slip degree determined by said wheel slip control system, and computing a desired cornering power corresponding to said desired slip degree;

a steady state gain modifying means for determining a modified value of a steady state gain of said reference model in accordance with said desired cornering power;

a constant altering means for changing said cornering power constant of said control input determining means to said modified value of said cornering power constant, and said steady state gain of said reference model to said modified value of said steady state gain in response to an actuation signal of said wheel slip control system; and an actuating means for controlling a behavior of said controlled vehicle in accordance with said control input command.

7. A vehicle motion control system according to claim 6 wherein said wheel slip control system is a traction control system for preventing a wheel idling by decreasing an engine output.

8. A vehicle motion control system according to claim 6 wherein said controlled vehicle is a rear wheel drive vehicle, and said cornering power constant is a rear wheel cornering power constant representing a rear wheel cornering power.

9. A vehicle motion control system according to claim 6 wherein said control input is at least one of a rear wheel steer angle and a front wheel steer angle.

10. A vehicle motion control system according to claim 6 wherein said steady state gain modifying means includes a means for modifying said steady state gain of said reference model so as to make said steady state gain of said reference model closer to a vehicle inherent steady state gain during operation of said wheel slip control system.

11. A vehicle motion control system according to claim 6, wherein said wheel slip control system includes:

a wheel speed sensing means for sensing a drive wheel speed of the vehicle and a non-drive wheel speed of the vehicle; and a wheel slip controlling means for determining the wheel slip degree from the drive wheel speed and the non-drive wheel speed and controlling the wheel slip degree toward the desired slip degree by controlling at least one of a driving force and a braking force of the vehicle.

12. A vehicle motion control system comprising:

a wheel slip control system for sensing a wheel slip and controlling a wheel slip degree toward a desired slip degree;

a steering angle sensing means for sensing a steering input representing a steering angle;

a vehicle speed sensing means for sensing a vehicle speed;

a target vehicle motion setting means for receiving a steering input signal representing said steering input and a vehicle speed signal representing said vehicle speed, and determining a desired vehicle motion variable by using a first model which is one of a reference mathematical model simulating a desired dynamic characteristic and a vehicle model described by an equation of motion;

a control input determining means for receiving said steering input, said vehicle speed and said desired motion variable, and determining a control input command to make a motion of an actual vehicle closer to said desired motion variable by performing an inverse operation of an equation of vehicle motion with an inverse model comprising vehicle constants representing vehicle specification items of a controlled vehicle;

a modified cornering power determining means for receiving the wheel slip degree detected by said wheel slip control system, and determining a modified value of a cornering power constant which is one of said vehicle constants of said inverse model and which corresponds to a cornering power of said controlled vehicle, in accordance with said wheel slip degree;

a desired cornering power determining means for receiving a desired slip degree determined by said wheel slip control system, and determining a desired cornering power corresponding to said desired slip degree;

a constant altering means for changing said cornering power constant of said control input determining means to said modified value of said cornering power constant in response to an actuation signal of said wheel slip control system, and a cornering power constant of said vehicle model of said target motion determining means to said desired cornering power; and an actuating means for controlling a vehicle motion in accordance with said control input command.

13. A vehicle motion control system according to claim 12 wherein said wheel slip control system is a traction control system for preventing a wheel idling by decreasing an engine output.

14. A vehicle motion control system according to claim 12 wherein said controlled vehicle is a rear wheel drive vehicle, said cornering power constant calculated by said modified cornering power determining means is a rear wheel cornering power constant representing a rear wheel cornering power, and said cornering power constant calculated by said desired cornering power determining means is a rear wheel cornering power constant representing a rear wheel cornering power.

15. A vehicle motion control system according to claim 12 wherein said control input is at least one of a rear wheel steer angle and a front wheel steer angle.

16. A vehicle motion control system according to claim 12, wherein said wheel slip control system includes:

a wheel speed sensing means for sensing a drive wheel speed of the vehicle and a non-drive wheel speed of the vehicle; and a wheel slip controlling means for determining the wheel slip degree from the drive wheel speed and the non-drive wheel speed and controlling the wheel slip degree toward the desired slip degree by controlling at least one of a driving force and a braking force of the vehicle.

17. A vehicle motion control system comprising:

a wheel slip control system for sensing a wheel slip and controlling a wheel slip degree toward a desired slip degree;

a steering angle sensing means for sensing a steering input representing a steering angle;

a vehicle speed sensing means for sensing a vehicle speed;

a first control input computing means for receiving a steering input signal representing said steering input and a vehicle speed signal representing said vehicle speed, and determining a first control input by using a predetermined function;

a target vehicle motion setting means for receiving said steering input, said vehicle speed and said first control input, and determining a desired vehicle motion variable by using a vehicle model comprising an equation of motion;

a second control input computing means for receiving said steering input, said vehicle speed, said first control input and said desired motion variable, and determining a second control input to make an actual vehicle motion closer to said desired motion variable by performing an inverse operation of an equation of vehicle motion by using an inverse vehicle model comprising vehicle constants characteristic of a controlled vehicle;

a control input determining means for determining a control input command by adding said first and second control inputs;

a cornering power modifying means for receiving the wheel slip degree detected by said wheel slip control system, and determining a modified value of a cornering power constant which is one of said vehicle constants of said second control input computing means and which corresponds to a cornering power, in accordance with said wheel slip degree;

a constant altering means for changing said cornering power constant of said second control input computing means to said modified value in response to an actuation signal of said wheel slip control system; and an actuating means for controlling a vehicle motion in accordance with said control input command determined by said control input determining means.

18. A vehicle motion control system according to claim 17 wherein said wheel slip control system is a traction control system for preventing a wheel idling by decreasing an engine output.

19. A vehicle motion control system according to claim 17 wherein said controlled vehicle is a rear wheel drive vehicle, and said cornering power constant is a constant representing a rear wheel cornering power.

20. A vehicle motion control system according to claim 17 wherein said control input is at least one of a rear wheel steer angle and a front wheel steer angle.

21. A vehicle motion control system according to claim 17 wherein said vehicle model of said target motion setting means comprises a cornering power constant representing a cornering power and further vehicle constants, and said further vehicle constants of said target motion setting means are set equal to respective ones of said vehicle constants of said second control input computing means.

22. A vehicle motion control system according to claim 17, wherein said wheel slip control system includes:
- a wheel speed sensing means for sensing a drive wheel speed of the vehicle and a non-drive wheel speed of the vehicle; and
- a wheel slip controlling means for determining the wheel slip degree from the drive wheel speed and the non-drive wheel speed and controlling the wheel slip degree toward the desired slip degree by controlling at least one of a driving force and a braking force of the vehicle.

23. A vehicle motion control system comprising:
- a wheel slip control system for sensing a wheel slip and controlling a wheel slip degree toward a desired slip degree;
- a steering angle sensing means for sensing a steering input representing a steering angle;
- a vehicle speed sensing means for sensing a vehicle speed;
- a first control input computing means for receiving a steering input signal representing said steering input and a vehicle speed signal representing said vehicle speed, and determining a first control input by using a predetermined function;
- a target vehicle motion setting means for receiving said steering input, said vehicle speed and said first control input, and determining a desired vehicle motion variable by using a vehicle model described by an equation of motion;
- a second control input computing means for receiving said steering input, said vehicle speed, said first control input and said desired motion variable, and determining a second control input to make an actual vehicle motion closer to said desired motion variable by performing an inverse operation of an equation of vehicle motion by using vehicle constants characteristic of a controlled vehicle;
- a control input determining means for determining a control input command by adding said first and second control inputs;
- a modified cornering power determining means for receiving the wheel slip degree detected by said wheel slip control system, and determining a modified value of a cornering power constant which is one of said vehicle constants of said second control input computing means and which corresponds to a cornering power, in accordance with said wheel slip degree;
- a desired cornering power calculating means for receiving a desired slip degree determined by said wheel slip control system, and calculating a desired cornering power corresponding to said desired slip degree;
- a constant altering means for changing said cornering power constant of said second control input determining means to said modified value of the cornering power constant, and a cornering power constant of said vehicle model of said target motion setting means to said desired cornering power in response to an actuation signal of said wheel slip control system; and
- an actuating means for controlling a vehicle motion in accordance with said control input command determined by said control input determining means.

24. A vehicle motion control system according to claim 23 wherein said wheel slip control system is a traction control system for preventing a wheel idling by decreasing an engine output.

25. A vehicle motion control system according to claim 23 wherein said controlled vehicle is a rear wheel drive vehicle, and each of the value determined by said modified cornering power determining means and the value determined by said desired cornering power calculating mean is a rear wheel cornering power.

26. A vehicle motion control system according to claim 23 wherein each of said control inputs is at least one of a rear wheel steer angle and a front wheel steer angle.

27. A vehicle motion control system according to claim 23 wherein said vehicle model of said target motion setting means comprises vehicle constants which represent vehicle specification items and which are equal to the vehicle constants of said second control input computing means except for said modified value of said cornering power constant and said desired cornering power.

28. A vehicle motion control system according to claim 23, wherein said wheel slip control system includes:
- a wheel speed sensing means for sensing a drive wheel speed of the vehicle and a non-drive wheel speed of the vehicle; and
- a wheel slip controlling means for determining the wheel slip degree from the drive wheel speed and the non-drive wheel speed and controlling the wheel slip degree toward the desired slip degree by controlling at least one of a driving force and a braking force of the vehicle.

29. A vehicle control system for a controlled vehicle, comprising:
- a wheel spinning condition sensing means for sensing an actual wheel spinning condition of said controlled vehicle;
- a wheel slip control actuator for performing a wheel slip control operation in response to a wheel slip control signal;
- a steering input sensing means for sensing an actual steering input of said controlled vehicle;
- a vehicle speed sensing means for sensing an actual vehicle speed of said controlled vehicle;
- a vehicle directional motion control actuator for performing a vehicle motion control operation in response to a vehicle motion control signal; and
- a vehicle controller for producing said wheel slip control signal in accordance with said actual wheel spinning condition, and for producing said vehicle motion control signal in accordance with said actual wheel spinning condition, said actual steering input and said actual vehicle speed;
- wherein said vehicle controller stores an input-to-response mathematical model for determining a value of a desired steering response corresponding to a value of a steering input and a value of a vehicle speed, and an inverse mathematical model which is for determining, from a value of a predetermined steering response, a required control input required to achieve the value of the predetermined steering response in said controlled vehicle, and which comprises a group of vehicle constants representing vehicle specification data items specifying a steering response of said controlled vehicle, said group of the vehicle constants comprising a cornering power constant representing a cornering power of said controlled vehicle; and
- wherein said vehicle controller comprises a vehicle motion controlling means for determining said desired vehicle steering response by solving said input-toresponse mathematical model by use of the actual steering input and the actual vehicle speed, for determining said required control input required to achieve said desired steering response by solving said inverse mathematical model by use of the actual steering input, the actual vehicle speed and said desired vehicle response, for adjusting said cornering power constant of said inverse model in dependence on said actual wheel spinning condition to prevent a behavior of said controlled vehicle from being fluctuated by the wheel slip control operation, and for producing said vehicle motion control signal in accordance with said required control input.

30. A vehicle control system according to claim 29 wherein said vehicle controller comprises a wheel slip controlling means for determining an actual wheel slip degree from said actual wheel spinning condition, for producing said wheel slip control signal in accordance with said actual wheel slip degree and for producing an actuation signal when said actual wheel slip degree is in a predetermined condition; wherein said wheel slip control actuator is an actuator for controlling one of a rear wheel longitudinal tire force and a front wheel longitudinal tire force of said controlled vehicle, and said vehicle motion control actuator is a steering actuator for controlling one of a front wheel steer angle and a rear wheel steer angle of said controlled vehicle; and wherein said vehicle motion controlling means comprises a model adjusting means for decreasing said cornering power constant as said actual wheel slip degree increases when said model adjusting means receives said actuation signal from said wheel slip controlling means.

31. A vehicle control system according to claim 30 wherein said model adjusting means comprises a first adjusting means for receiving a signal representing said actual wheel slip degree and said actuation signal from said wheel slip controlling means and adjusting said cornering power constant of said inverse model in dependence on said actual wheel slip degree when said first adjusting means receives said actuation signal, and a second adjusting means for receiving said actuation signal and a signal representing a desired wheel slip degree from said wheel slip controlling means, and adjusting said input-to-response model in dependence on said desired slip degree when said second adjusting means receives said actuation signal.

32. A vehicle control system according to claim 31 wherein said vehicle motion controlling means includes a means for adjusting an adjustable parameter of said input-to-response model in accordance with said desired wheel slip degree, and said adjustable parameter of said input-to-response model is one of a cornering power constant of said input-to-response model and a steady state response gain of said input-to-response model.

33. A vehicle control system according to claim 30 wherein said second operating means comprises a feed-forward compensating means for receiving said actual steering input and said actual vehicle speed and determining a feed-forward control input in dependence on said actual steering input and said actual vehicle speed; a target motion determining means for solving, for said desired steering response, said input-to-response model by use of said actual steering input, said actual vehicle speed and said feed-forward control input; a required control input determining means for receiving said actual steering input, said actual vehicle speed, said feed-forward control input and said desired steering response and solving, for said required control input, said inverse model by use of said actual steering input, said actual vehicle speed, said feed-forward control input and said desired steering response; and a steering control signal generating means for generating said steering control signal in accordance with said feed-forward control input and said required control input.

34. A vehicle control system according to claim 29 wherein said wheel spinning condition sensing means comprises wheel speed sensors for sensing an actual front wheel speed and an actual rear wheel speed of said controlled vehicle, said wheel slip controlling means includes a means for determining said actual wheel slip degree which is an actual drive wheel slip degree in accordance with said actual wheel speeds, and producing said wheel slip control signal so as to cause said actual wheel slip degree to approach a desired wheel slip degree, and a wheel slip control actuator is a traction control actuator for varying an engine output of said controlled vehicle; and wherein said cornering power constant is a constant representing a drive wheel cornering power.

* * * * *